(12) United States Patent
Morinaga

(10) Patent No.: US 11,079,644 B2
(45) Date of Patent: Aug. 3, 2021

(54) LIQUID CRYSTAL DISPLAY DEVICE AND MANUFACTURING METHOD OF THE SAME

(71) Applicant: SHARP KABUSHIKI KAISHA, Sakai (JP)

(72) Inventor: Junichi Morinaga, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 0 days.

(21) Appl. No.: 17/131,351

(22) Filed: Dec. 22, 2020

(65) Prior Publication Data

US 2021/0200008 A1   Jul. 1, 2021

(30) Foreign Application Priority Data

Dec. 26, 2019   (JP) .............................. JP2019-235844

(51) Int. Cl.
*G02F 1/1368* (2006.01)
*G02F 1/1343* (2006.01)
(Continued)

(52) U.S. Cl.
CPC ........ *G02F 1/1368* (2013.01); *G02F 1/13394* (2013.01); *G02F 1/13439* (2013.01);
(Continued)

(58) Field of Classification Search
CPC ............. H01L 27/3276; H01L 27/3262; H01L 29/78633; H01L 29/786; H01L 29/41733; H01L 29/4908; H01L 21/02565; H01L 21/02554; H01L 21/02483; H01L 21/02488; G02F 1/1368; G02F 1/136286; G02F 1/136227; G02F 1/136209;
(Continued)

(56) References Cited

U.S. PATENT DOCUMENTS

2008/0035920 A1   2/2008   Takechi et al.
2010/0320471 A1   12/2010  Takechi et al.
(Continued)

FOREIGN PATENT DOCUMENTS

JP   2008-040343 A   2/2008
JP   2012-134475 A   7/2012
(Continued)

*Primary Examiner* — Thoi V Duong
(74) *Attorney, Agent, or Firm* — ScienBiziP, P.C.

(57) ABSTRACT

An active matrix substrate of a liquid crystal display device includes a first substrate, a light blocking layer, a lower insulating layer, a pixel TFT, a source wiring line, a pixel electrode, and a common electrode. The pixel TFT includes an oxide semiconductor layer. The oxide semiconductor layer includes a channel region, and first and second low-resistive regions. The source wiring line is located between the main surface of the first substrate and the lower insulating layer, and is formed from a conductive film the same as the light blocking layer. The pixel electrode is formed from an oxide film the same as the oxide semiconductor layer, and is continuous with the second low-resistive region. The active matrix substrate further includes a connection electrode that is formed from a transparent conductive film the same as the common electrode and connects the source wiring line to the first low-resistive region.

10 Claims, 17 Drawing Sheets

(51) Int. Cl.
*G02F 1/1333* (2006.01)
*G02F 1/1362* (2006.01)
*G02F 1/1339* (2006.01)
*G09G 3/36* (2006.01)

(52) U.S. Cl.
CPC .. G02F 1/133345 (2013.01); G02F 1/136209 (2013.01); G02F 1/136227 (2013.01); G02F 1/136286 (2013.01); G02F 1/136295 (2021.01); *G02F 1/13685* (2021.01); *G02F 1/134309* (2013.01); *G02F 1/134318* (2021.01); *G02F 2201/121* (2013.01); *G02F 2202/10* (2013.01); *G09G 3/3677* (2013.01); *G09G 2300/0452* (2013.01); *G09G 2310/0281* (2013.01)

(58) Field of Classification Search
CPC ......... G02F 1/134363; G02F 1/133345; G02F 1/133357; G02F 1/134372; G02F 1/13685; G02F 1/134309; G02F 1/136295; G02F 1/133512; G02F 1/13394; G02F 1/13439; G02F 1/1362; G02F 1/136277; G02F 1/1333; G02F 1/134318; G02F 1/134336; G02F 1/1343; G02F 2201/121; G02F 2201/123; G02F 2202/10; G09G 2300/0426; G09G 2300/0439; G09G 2300/0452; G09G 2310/0281; G09G 3/3677
See application file for complete search history.

(56) References Cited

U.S. PATENT DOCUMENTS

| | | |
|---|---|---|
| 2012/0138922 A1 | 6/2012 | Yamazaki et al. |
| 2013/0214273 A1 | 8/2013 | Yamazaki et al. |
| 2013/0320334 A1 | 12/2013 | Yamazaki et al. |
| 2014/0183532 A1 | 7/2014 | Yamazaki et al. |
| 2014/0286076 A1 | 9/2014 | Aoki et al. |
| 2015/0001542 A1* | 1/2015 | Jang ............... H01L 27/124 257/67 |
| 2015/0179805 A1 | 6/2015 | Yamazaki et al. |
| 2016/0240694 A1 | 8/2016 | Yamazaki et al. |
| 2017/0033229 A1 | 2/2017 | Yamazaki et al. |
| 2017/0090229 A1* | 3/2017 | Imai ............... G02F 1/1368 349/43 |
| 2017/0309751 A1 | 10/2017 | Yamazaki et al. |
| 2017/0309754 A1 | 10/2017 | Yamazaki et al. |
| 2018/0308989 A1 | 10/2018 | Yamazaki et al. |
| 2020/0185425 A1 | 6/2020 | Hara et al. |

FOREIGN PATENT DOCUMENTS

| | | |
|---|---|---|
| JP | 2014-007399 A | 1/2014 |
| JP | 2014-209727 A | 11/2014 |
| WO | 2018/212100 A1 | 11/2018 |

\* cited by examiner

| STEP 1<br>FORM LIGHT BLOCKING LAYER<br>AND SOURCE WIRING LINE | DEPOSIT SOURCE METAL FILM |
| --- | --- |
| | PHOTOLITHOGRAPHY PROCESS (RESIST PATTERNING) |
| | ETCH SOURCE METAL FILM |
| | PEEL RESIST |

⇩

| STEP 2<br>FORM LOWER INSULATING<br>LAYER AND OXIDE<br>SEMICONDUCTOR FILM | DEPOSIT FIRST INSULATING FILM |
| --- | --- |
| | DEPOSIT OXIDE SEMICONDUCTOR FILM |
| | PHOTOLITHOGRAPHY PROCESS (RESIST PATTERNING) |
| | ETCH OXIDE SEMICONDUCTOR FILM |
| | PEEL RESIST |

⇩

| STEP 3<br>FORM GATE INSULATING<br>LAYER, GATE ELECTRODE,<br>AND GATE WIRING LINE | DEPOSIT SECOND INSULATING FILM |
| --- | --- |
| | DEPOSIT GATE METAL FILM |
| | PHOTOLITHOGRAPHY PROCESS (RESIST PATTERNING) |
| | ETCH GATE METAL FILM |
| | ETCH SECOND INSULATING FILM |
| | PEEL RESIST |

| STEP 4<br>LOWER RESISTANCE OF OXIDE<br>SEMICONDUCTOR FILM | PERFORM PLASMA TREATMENT ON OXIDE<br>SEMICONDUCTOR FILM |
| --- | --- |

⇩

| STEP 5<br>FORM INTERLAYER<br>INSULATING LAYER AND<br>CONTACT HOLE | DEPOSIT INTERLAYER INSULATING LAYER (THIRD INSULATING FILM) |
| --- | --- |
| | PHOTOLITHOGRAPHY PROCESS (RESIST PATTERNING) |
| | ETCH INTERLAYER INSULATING LAYER |
| | ETCH LOWER INSULATING LAYER |
| | PEEL RESIST |

⇩

| STEP 6<br>FORM COMMON ELECTRODE<br>AND CONNECTION ELECTRODE | DEPOSIT TRANSPARENT CONDUCTIVE FILM |
| --- | --- |
| | PHOTOLITHOGRAPHY PROCESS (RESIST PATTERNING) |
| | ETCH TRANSPARENT CONDUCTIVE FILM |
| | PEEL RESIST |

FIG. 3

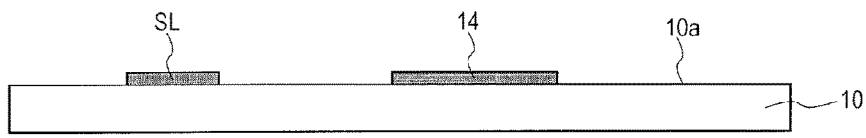

FIG. 4A

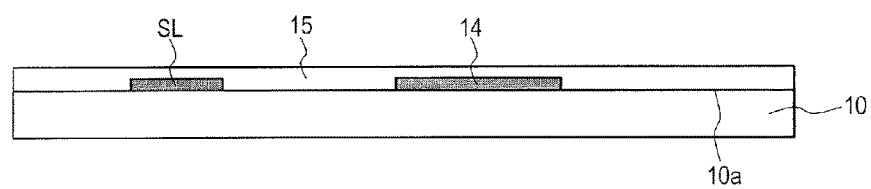

FIG. 4B

| STEP 1<br>FORM LIGHT BLOCKING LAYER | DEPOSIT LIGHT BLOCKING FILM |
| --- | --- |
| | PHOTOLITHOGRAPHY PROCESS (RESIST PATTERNING) |
| | ETCHING LIGHT BLOCKING FILM |
| | PEEL RESIST |

| STEP 2<br>FORM LOWER INSULATING LAYER<br>AND OXIDE SEMICONDUCTOR FILM | DEPOSIT FIRST INSULATING FILM |
| --- | --- |
| | DEPOSIT OXIDE SEMICONDUCTOR FILM |
| | PHOTOLITHOGRAPHY PROCESS (RESIST PATTERNING) |
| | ETCH OXIDE SEMICONDUCTOR FILM |
| | PEEL RESIST |

| STEP 3<br>FORM GATE INSULATING LAYER,<br>GATE ELECTRODE, AND GATE<br>WIRING LINE | DEPOSIT SECOND INSULATING FILM |
| --- | --- |
| | DEPOSIT GATE METAL FILM |
| | PHOTOLITHOGRAPHY PROCESS (RESIST PATTERNING) |
| | ETCH GATE METAL FILM |
| | ETCH SECOND INSULATING FILM |
| | PEEL RESIST |

| STEP 4<br>LOWER RESISTANCE OF OXIDE<br>SEMICONDUCTOR FILM | PERFORM PLASMA TREATMENT ON OXIDE SEMICONDUCTOR FILM |
| --- | --- |

| STEP 5<br>FORM FIRST INTERLAYER<br>INSULATING LAYER AND CONTACT<br>HOLE | DEPOSIT FIRST INTERLAYER INSULATING LAYER (THIRD INSULATING FILM) |
| --- | --- |
| | PHOTOLITHOGRAPHY PROCESS (RESIST PATTERNING) |
| | ETCH FIRST INTERLAYER INSULATING LAYER |
| | PEEL RESIST |

| STEP 6<br>FORM SOURCE ELECTRODE, DRAIN<br>ELECTRODE, AND SOURCE WIRING<br>LINE | DEPOSIT SOURCE METAL FILM |
| --- | --- |
| | PHOTOLITHOGRAPHY PROCESS (RESIST PATTERNING) |
| | ETCH SOURCE METAL FILM |
| | PEEL RESIST |

| STEP 7<br>FORM SECOND INTERLAYER<br>INSULATING LAYER, ORGANIC<br>INSULATING LAYER, AND CONTACT<br>HOLE | DEPOSIT SECOND INTERLAYER INSULATING LAYER (FOURTH INSULATING FILM) |
| --- | --- |
| | DEPOSIT ORGANIC INSULATING LAYER (FIFTH INSULATING FILM) |
| | PATTERN ORGANIC INSULATING LAYER |
| | ASH ORGANIC INSULATING LAYER |
| | ETCH SECOND INTERLAYER INSULATING LAYER |
| | ETCH LOWER INSULATING LAYER |
| | PEEL RESIST |

| STEP 8<br>FORM PIXEL ELECTRODE | DEPOSIT FIRST TRANSPARENT CONDUCTIVE FILM |
| --- | --- |
| | PHOTOLITHOGRAPHY PROCESS (RESIST PATTERNING) |
| | ETCH FIRST TRANSPARENT CONDUCTIVE FILM |
| | PEEL RESIST |

| STEP 9<br>FORM THIRD INTERLAYER<br>INSULATING LAYER | DEPOSIT THIRD INTERLAYER INSULATING LAYER (SIXTH INSULATING FILM) |
| --- | --- |
| | PHOTOLITHOGRAPHY PROCESS (RESIST PATTERNING) |
| | ETCH THIRD INTERLAYER INSULATING LAYER |
| | PEEL RESIST |

| STEP 10<br>FORM COMMON ELECTRODE | DEPOSIT SECOND TRANSPARENT CONDUCTIVE FILM |
| --- | --- |
| | PHOTOLITHOGRAPHY PROCESS (RESIST PATTERNING) |
| | ETCH SECOND TRANSPARENT CONDUCTIVE FILM |
| | PEEL RESIST |

FIG. 8

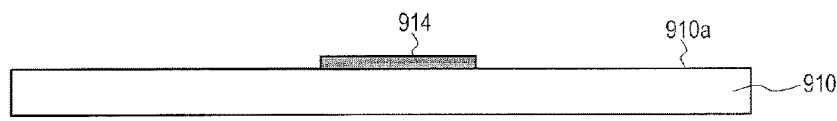

FIG. 9A

LIQUID CRYSTAL DISPLAY DEVICE AND MANUFACTURING METHOD OF THE SAME

CROSS-REFERENCE TO RELATED APPLICATIONS

This application claims the benefit of priority to Japanese Patent Application Number 2019-235844 filed on Dec. 26, 2019. The entire contents of the above-identified application are hereby incorporated by reference.

BACKGROUND

Technical Field

The disclosure is related to a liquid crystal display device and a manufacturing method of a liquid crystal display device.

Currently, a liquid crystal display device that is widely used includes an active matrix substrate provided with switching elements on a pixel-by-pixel basis. An active matrix substrate provided with thin film transistors (hereinafter referred to as a "TFT") as the switching elements is referred to as a TFT substrate. Note that a region of the active matrix substrate corresponding to pixels of the liquid crystal display device may also be referred to herein as pixels. The TFT provided as a switching element to each pixel of the active matrix substrate may be referred to as a "pixel TFT".

In recent years, use of an oxide semiconductor as a material of an active layer of the TFT, in place of amorphous silicon and polycrystalline silicon, has been proposed. A TFT having an oxide semiconductor film as an active layer is referred to as an "oxide semiconductor TFT". JP 2012-134475 A discloses an active matrix substrate in which an In—Ga—Zn—O-based semiconductor film is used in an active layer of a TFT.

The oxide semiconductor has mobility higher than that of amorphous silicon. Thus, the oxide semiconductor TFT can operate at a higher speed than an amorphous silicon TFT. In addition, since an oxide semiconductor film is formed by a process simpler than that of a polycrystalline silicon film, the oxide semiconductor film can be applied to a device that requires a large area.

A structure of the TFT is roughly classified into a bottom gate structure and a top gate structure. Currently, although many oxide semiconductor TFTs have the bottom gate structure, an oxide semiconductor TFT having the top gate structure is also proposed (for example, WO 2018/212100). In the top gate structure, the gate insulating layer can be thinned, resulting in high current supply performance.

In the liquid crystal display device, a gate driver or a Source Shared driving (SSD) circuit may be integrally (monolithically) formed on the active matrix substrate for the purpose of frame narrowing of the liquid crystal panel and reducing the number of mounted driver ICs. The gate driver monolithically formed on the active matrix substrate may be referred to as a GDM circuit. In the active matrix substrate on which the GDM circuit and the SSD circuit are monolithically formed, the TFT needs to charge a large capacitance (bus line capacitance), so the TFT preferably has the top gate structure. The top gate structure is preferable also from the perspective of allowing space saving for frame narrowing.

In the TFT having the top gate structure, a configuration is known in which a light blocking layer is provided below a channel region of the semiconductor layer in order to prevent an occurrence of leakage current due to irradiation of a light to the semiconductor layer. WO 2018/212100 discloses a configuration in which such a light blocking layer is provided.

In the recent past, a Fringe Field Switching (FFS) mode has often been adopted as a display mode for a small- and medium-sized liquid crystal display device used in a tablet, a laptop PC, and a smartphone.

In the FFS mode liquid crystal display device, a pair of electrodes for generating a fringe electrical field is provided on one of a pair of substrates that sandwich a horizontally-aligned liquid crystal layer. The pair of electrodes is configured, for example, by a pixel electrode with a plurality of slits formed therein, and a common electrode disposed below the pixel electrode with an insulating layer interposed therebetween. Alternatively, the pair of electrodes is configured by a common electrode with a plurality of slits formed therein, and a pixel electrode disposed below the common electrode with an insulating layer interposed therebetween. When a voltage is applied between the pixel electrode and the common electrode, the fringe electrical field is generated and an alignment regulating force of the fringe electrical field changes an alignment direction of liquid crystal molecules.

In this way, in the FFS mode liquid crystal display device, an alignment state of the liquid crystal molecules is controlled using the fringe electrical field. In the FFS mode, since the liquid crystal molecules rotate in a plane parallel to a display surface, high viewing angle characteristics are obtained.

SUMMARY

There is a problem in that in a case that an oxide semiconductor TFT having the top gate structure is used as the pixel TFT of the liquid crystal display device displaying in the FFS mode, manufacturing processes of the active matrix substrate are increased to increase manufacturing costs. This comes from that the FFS mode needs two layers of transparent electrodes (the pixel electrode and the common electrode) which are disposed one above the other with the insulating layer interposed therebetween, and the oxide semiconductor TFT having the top gate structure needs a multilayer structure of a light blocking layer, an oxide semiconductor layer, a gate wiring line, a source wiring line, and the like.

The disclosure has been made in view of the problems described above, and has an object to reduce manufacturing processes of a liquid crystal display device in an FFS mode including an oxide semiconductor TFT having a top gate structure as a pixel TFT to reduce manufacturing costs.

A liquid crystal display device a manufacturing method of a liquid crystal display device are disclosed herein in the following items.

Item 1

A liquid crystal display device including:

an active matrix substrate;

a counter substrate disposed to face the active matrix substrate;

a liquid crystal layer provided between the active matrix substrate and the counter substrate; and a plurality of pixels arranged in a matrix including a plurality of rows and a plurality of columns, wherein the active matrix substrate includes a first substrate having a main surface, a plurality of light blocking layers provided on the main surface of the first substrate, a lower insulating layer provided to cover the plurality of light blocking layers, pixel TFTs, each pixel TFT being provided corresponding to each of the plurality of pixels, the pixel TFT including an oxide semiconductor layer provided on the lower insulating layer, a gate insulating layer provided on the oxide semiconductor layer, and a gate electrode provided to face the oxide semiconductor layer with the gate insulating layer interposed between the gate electrode and the oxide semiconductor layer, a plurality of gate wiring lines extending in a row direction, each gate wiring line being formed from a conductive film the same as the gate electrode, a plurality of source wiring lines extending in a column direction, a plurality of pixel electrodes, each pixel electrode being provided in each of the plurality of pixels and electrically connected to the pixel TFT, an interlayer insulating layer provided to cover the oxide semiconductor layer, the gate electrode, and the plurality of gate wiring lines, and a common electrode provided on the interlayer insulating layer, the oxide semiconductor layer includes a channel region, a first low-resistive region, and a second low-resistive region, the first low-resistive region and the second low-resistive region being located on both sides of the channel region and having specific resistances lower than the channel region, the plurality of source wiring lines are located between the main surface of the first substrate and the lower insulating layer, and are formed from a conductive film the same as the plurality of light blocking layers, the pixel electrode is formed from an oxide film the same as the oxide semiconductor film, and is continuous with the second low-resistive region of the oxide semiconductor layer, and the active matrix substrate further includes a connection electrode formed from a transparent conductive film the same as the common electrode, the connection electrode connecting any one of the plurality of source wiring lines to the first low-resistive region of the oxide semiconductor layer.

Item 2

In the liquid crystal display device described in item 1, the connection electrode connects any one of the plurality of source wiring lines to the first low-resistive region of the oxide semiconductor layer within a contact hole formed in the interlayer insulating layer and the lower insulating layer.

Item 3

In the liquid crystal display device described in item 2, the oxide semiconductor layer overlaps a substantial half of a region located within the contact hole of the corresponding source wiring line when viewed from a normal direction of the main surface of the first substrate.

Item 4

In the liquid crystal display device described in any one of items 1 to 3, the plurality of pixels constitute a plurality of color display pixels, and each of the plurality of color display pixels includes three or more pixels arranged in the column direction and exhibiting colors different from each other.

Item 5

In the liquid crystal display device described in item 4, the active matrix substrate further includes a gate wiring line drive circuit configured to drive the plurality of gate wiring lines, and the gate wiring line drive circuit being monolithically formed on the first substrate.

Item 6

In the liquid crystal display device described in any one of items 1 to 5, the active matrix substrate does not include an organic insulating layer between the common electrode and the first substrate.

Item 7

The liquid crystal display device according to any one of claims 1 to 6, wherein the counter substrate includes a second substrate, and a plurality of columnar spacers provided on the second substrate, and the active matrix substrate further includes a plurality of protruding portions formed from an organic insulating material and positioned in a layer above the common electrode, each of the plurality of protruding parts overlapping each of the plurality of columnar spacers when viewed from the normal direction of the main surface of the first substrate.

Item 8

In the liquid crystal display device described in any one of items 1 to 7, the oxide semiconductor layer includes an In—Ga—Zn—O based semiconductor.

Item 9

In the liquid crystal display device described in item 8, the In—Ga—Zn—O based semiconductor includes a crystalline portion.

Item 10

A manufacturing method of a liquid crystal display device, the liquid crystal display device being described in any one of items 1 to 9, includes:

(A) preparing the active matrix substrate; and (B) preparing the counter substrate, wherein the (A) preparing the active matrix substrate includes (a) depositing a first conductive film on the main surface of the first substrate, and then, patterning the first conductive film to form the plurality of light blocking layers and the plurality of source wiring lines, (b) forming the lower insulating layer to cover the plurality of light blocking layers and the plurality of source wiring lines, and then, depositing an oxide semiconductor film on the lower insulating layer, and then, patterning the oxide semiconductor film, (c) depositing an insulating film and a second conductive film in this order to cover the oxide semiconductor film, and then, patterning the insulating film and the second conductive film to form the gate insulating layer, the gate electrode, and the plurality of gate wiring lines, (d) forming the interlayer insulating layer to cover the oxide semiconductor layer, the gate electrode, and the plurality of gate wiring lines, and (e) depositing a transparent conductive film on the interlayer insulating layer, and then, patterning the transparent conductive film to form the common electrode, and the (A) preparing the active matrix substrate further includes (f) lowering a resistance of a portion of the oxide semiconductor film to obtain the first low-resistive region, the second low-resistive region, and the pixel electrode, wherein the (e) depositing a transparent conductive film includes patterning the transparent conductive film to form a connection electrode with the common electrode, the connection electrode connecting any one of the plurality of source wiring lines to the first low-resistive region.

According to embodiments of the disclosure, it is possible to reduce manufacturing processes of a liquid crystal display device with a FFS mode including an oxide semiconductor TFT having a top gate structure as a pixel TFT to reduce manufacturing costs.

BRIEF DESCRIPTION OF DRAWINGS

The disclosure will be described with reference to the accompanying drawings, wherein like numbers reference like elements.

FIG. 3 is a flowchart illustrating an example of a manufacturing method of an active matrix substrate 1 included in the liquid crystal display device 100.

FIG. 4A is a process cross-sectional view illustrating an example of the manufacturing method of the active matrix substrate 1.

FIG. 4B is a process cross-sectional view illustrating an example of the manufacturing method of the active matrix substrate 1.

FIG. 8 is a flowchart illustrating an example of a manufacturing method of an active matrix substrate 901 included in the liquid crystal display device 900.

FIG. 9A is a process cross-sectional view illustrating an example of the manufacturing method of the active matrix substrate 901.

DESCRIPTION OF EMBODIMENTS

Figure 1:
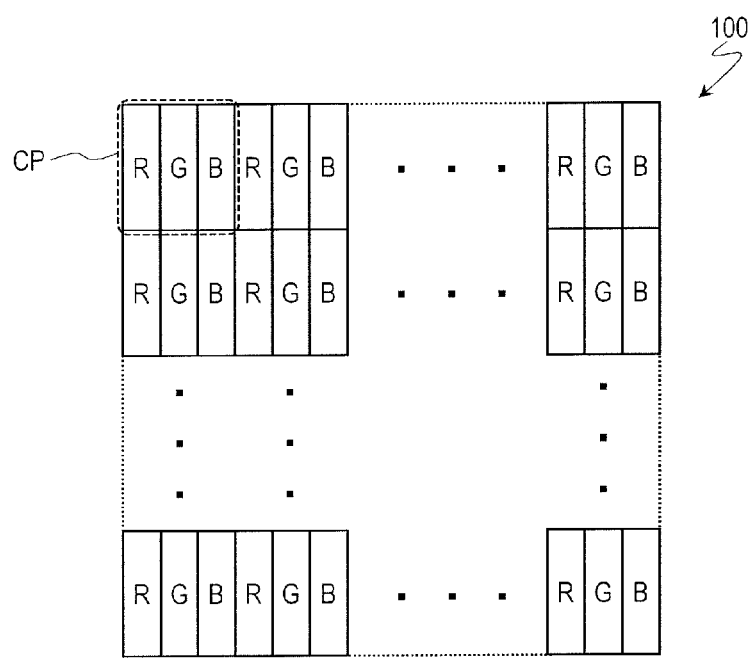
FIG. 1 is a diagram illustrating a pixel arrangement of a liquid crystal display device 100 according to an embodiment of the disclosure.

Hereinafter, embodiments of the disclosure will be described with reference to the accompanying drawings. Note that the disclosure is not limited to the embodiments to be described below. In the drawings referenced below, components having substantially the same function may be denoted by common reference symbols and descriptions thereof may be omitted. Furthermore, for ease of explanation, configurations are simplified or schematically illustrated and some components are omitted in the drawings referenced below. The dimensional ratio between the components illustrated in each drawing is not necessarily indicative of the actual dimensional ratio.

First Embodiment

Figure 2A:
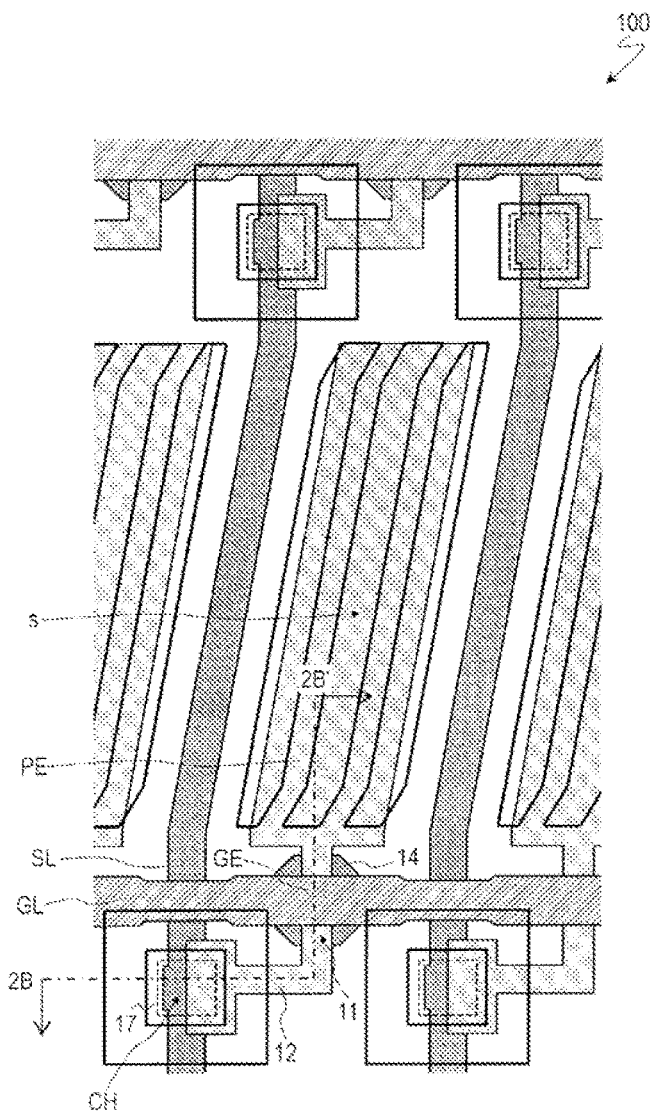
FIG. 2A is a plan view schematically illustrating the liquid crystal display device 100.
Figure 2B:
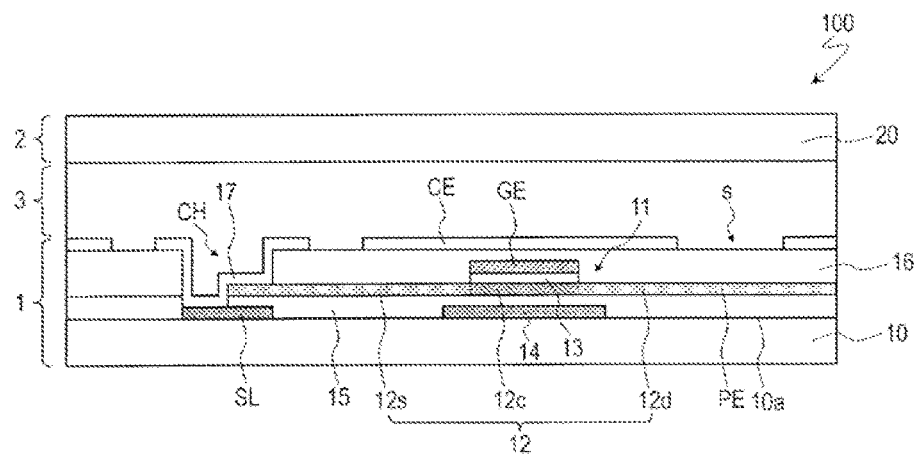
FIG. 2B is a cross-sectional view schematically illustrating the liquid crystal display device 100, and illustrates a cross section taken along a line 2B-2B' in FIG. 2A.

A liquid crystal display device 100 according to the present embodiment will be described with reference to FIG. 1 and FIGS. 2A and 2B. FIG. 1 is a diagram illustrating a pixel arrangement of the liquid crystal display device 100. FIGS. 2A and 2B are a plan view and a cross-sectional view, respectively, schematically illustrating the liquid crystal display device 100. FIG. 2B illustrates a cross section taken along a line 2B-2B' in FIG. 2A.

As illustrated in FIG. 1, the liquid crystal display device 100 includes a plurality of pixels arranged in a matrix including a plurality of rows and a plurality of columns. The plurality of pixels include red pixels R that display red, green pixels G that display green, and blue pixels B that display blue. The plurality of pixels constitute a plurality of color display pixels CP. Each of the plurality of color display pixels CP is constituted by three pixels that exhibit colors different from each other, namely, the red pixel R, the green pixel G, and the blue pixel B. In each of the color display pixels CP, the red pixel R, the green pixel G, and the blue pixel B are arranged in a row direction. The pixel arrangement illustrated in FIG. 1 may be referred to as a "vertical stripe arrangement".

As illustrated in FIG. 2B, the liquid crystal display device 100 includes an active matrix substrate 1, a counter substrate 2 arranged to face the active matrix substrate 1, and a liquid crystal layer 3 provided between the active matrix substrate 1 and the counter substrate 2. Although not illustrated here, the liquid crystal display device 100 is typically further provided with a backlight (illumination device) disposed on a back face side (opposite to a viewer) of the active matrix substrate 1.

The active matrix substrate 1 includes a first substrate 10 having a main surface 10a, pixel TFTs 11 each provided corresponding to each of a plurality of pixels, a plurality of gate wiring lines GL extending in the row direction, and a plurality of source wiring lines SL extending in a column direction, as illustrated in FIGS. 2A and 2B. Furthermore, the active matrix substrate 1 includes the plurality of light blocking layers 14, a lower insulating layer 15, pixel electrodes PE, an interlayer insulating layer 16, and a common electrode CE.

The first substrate 10 is transparent and has insulating properties. The first substrate 10 is, for example, a glass substrate or a plastic substrate.

The plurality of light blocking layers 14 are provided on the main surface 10a of the first substrate 10. Each of the plurality of light blocking layers 14 is disposed corresponding to each of the pixel TFTs 11, as described below. The light blocking layer 14 is formed of a conductive material (for example, metal material) having light blocking properties.

The lower insulating layer 15 is provided to cover the plurality of light blocking layers 14. As the lower insulating layer 15, a silicon oxide ($SiO_2$) layer or a silicon nitride (SiNx) layer can be used, for example. The lower insulating layer 15 may have a layered structure. For example, a silicon nitride layer may be included as a lower layer and a silicon oxide layer may be included as an upper layer.

The pixel TFT 11 includes an oxide semiconductor layer 12 provided on the lower insulating layer 15, a gate insulating layer 13 provided on the oxide semiconductor layer 12, and a gate electrode GE provided to face the oxide semiconductor layer 12 with the gate insulating layer 13 interposed therebetween. As such, the pixel TFT 11 is an oxide semiconductor TFT having the top gate structure. The pixel TFT 11 according to the present embodiment does not include a source electrode and a drain electrode formed of a metal material, as described in detail below.

The oxide semiconductor layer 12 includes a channel region 12c, and a first low-resistive region (source region) 12s and a second low-resistive region (drain region) 12d that have specific resistances lower than the channel region 12c. The channel region 12c overlaps the gate electrode GE when viewed from a normal direction of the main surface 10a of the first substrate 10 (referred to as the normal direction of the substrate plane in the following description). The first low-resistive region 12s and the second low-resistive region 12d are located on both sides of the channel region 12c. The light blocking layer 14 disposed corresponding to each pixel overlaps at least the channel region 12c when viewed from the normal direction of the substrate surface.

As the gate insulating layer 13, the insulating layer illustrated as a specific example of the lower insulating layer 15 can be used. In a case that an oxide layer such as a silicon oxide layer is used as the gate insulating layer 13 (or, as a bottom layer of the gate insulating layer 13 in a case that the gate insulating layer 13 has a layered structure), oxygen deficiency produced in the channel region 12c can be reduced by the oxide layer.

The plurality of gate wiring lines GL are formed from the conductive film (gate metal film) the same as the gate electrode GE. In the illustrated example, the gate electrode GE is integrally formed with any one of the plurality of gate wiring lines GL, and a portion of each gate wiring line GL overlapping the oxide semiconductor layer 12 functions as the gate electrode GE. In the following, all of the conductive layers formed from the gate metal film may be collectively referred to as the gate metal layer. In other words, the gate electrode GE and the gate wiring line GL can be said to be included in the gate metal layer. In the illustrated example, the gate insulating layer 13 is formed only in a region overlapping the gate metal layer when viewed from the normal direction of the substrate plane. In other words, an edge of the gate insulating layer 13 matches an edge of the gate metal layer.

The pixel electrode PE is provided to each of the plurality of pixels. The pixel electrode PE is electrically connected to the pixel TFT 11.

The interlayer insulating layer 16 is provided to cover the oxide semiconductor layer 12, the gate electrode GE, and the plurality of gate wiring lines GL. As the interlayer insulating layer 16, the insulating layer illustrated as a specific example of the lower insulating layer 15 can be used, and a silicon nitride layer can be used, for example.

The common electrode CE is provided on the interlayer insulating layer 16. The common electrode CE is formed of a transparent conductive material (e.g., ITO or IZO). At least one slit s is formed in the common electrode CE per pixel. Although FIG. 1 illustrates the example in which the common electrode CE has three slits s per pixel, the number and shape of slits s are not limited to the illustrated example.

The plurality of source wiring lines SL are located between the main surface 10a of the first substrate 10 and the lower insulating layer 15. The plurality of source wiring lines SL and the plurality of light blocking layers 14 are formed from the same conductive film (the source metal film). In the following, all the conductive layers formed from the source metal film may be collectively referred to as the source metal layer. Specifically, the plurality of source wiring lines SL and the plurality of light blocking layers 14 can be said to be included in the source metal layer.

The pixel electrode PE is formed from the oxide film the same as the oxide semiconductor layer 12. The pixel electrode PE is specifically formed by lowering the resistance of a portion of the oxide semiconductor film, and is continuous with the second low-resistive region 12d in the oxide semiconductor layer 12.

The active matrix substrate 1 further includes a connection electrode 17 formed from the transparent conductive film the same as the common electrode CE. The connection electrode 17 connects any one of the plurality of source wiring lines SL to the first low-resistive region 12s of the oxide semiconductor layer 12. In the present embodiment, the connection electrode 17 connects any one of the plurality of source wiring lines SL to the first low-resistive region 12s of the oxide semiconductor layer 12 within a contact hole CH formed in the interlayer insulating layer 16 and the lower insulating layer 15.

When viewed from the normal direction of the substrate plane, the oxide semiconductor layer 12 overlaps a substantial half of a region located within the contact hole CH of the corresponding source wiring line SL.

A first alignment film (not illustrated) is provided on an outermost surface of the active matrix substrate 1 to come into contact with the liquid crystal layer 3. The first alignment film is a horizontal alignment film, and has the liquid crystal molecules aligned substantially parallel to a surface thereof in a no voltage applied state.

The active matrix substrate 1 does not include an organic insulating layer between the common electrode CE and the first substrate 10.

The counter substrate (color filter substrate) 2 includes a second substrate 20, and a color filter and a black matrix (both not illustrated) supported by the second substrate 20.

The second substrate 20 is transparent and has insulating properties. The second substrate 20 is, for example, a glass substrate or a plastic substrate.

A second alignment film (not illustrated) is provided on an outermost surface of the counter substrate 2 to come into contact with the liquid crystal layer 3. The second alignment film is a horizontal alignment film, and has the liquid crystal molecules aligned substantially parallel to a surface thereof in the no voltage applied state.

Further, although not illustrated here, the liquid crystal display device 100 includes a pair of polarizers that face each other with at least the liquid crystal layer 3 interposed therebetween. For example, one of the pair of polarizers is disposed on the back face side of the active matrix substrate 1, and the other is disposed on a front face side of the counter substrate 2.

Next, a manufacturing method of the liquid crystal display device 100 will be described. The manufacturing method of the liquid crystal display device 100 includes a step of preparing the active matrix substrate 1 and a step of preparing the counter substrate 2.

Next, a step of preparing the active matrix substrate 1, i.e., the manufacturing method of the active matrix substrate 1 will be described with reference to FIG. 3, FIGS. 4A to 4D, and FIGS. 5A to 5D. FIG. 3 is a flowchart illustrating an example of the manufacturing method of the active matrix substrate 1. Each of FIGS. 4A to 4D and FIGS. 5A to 5D is a process cross-sectional view illustrating an example of the manufacturing method of the active matrix substrate 1.

Step 1: Form Light Blocking Layer 14 and Source Wiring Line SL.

As illustrated in FIG. 4A, the light blocking layer 14 and the source wiring line SL are formed on the main surface 10a of the first substrate 10. Specifically, first, a source metal film (a first conductive film) is deposited on the main surface 10a of the first substrate 10 by, for example, sputtering, and then, the source metal film is pattered, so that the light blocking layer 14 and the source wiring line SL can be formed. Patterning of the source metal film is performed by sequentially performing a photolithography process (patterning of a resist), etching of the source metal film, and peeling of the resist.

A glass substrate, a silicon substrate, a plastic substrate (resin substrate) having heat resistance, or the like can be used as the first substrate 10.

Examples of the source metal film include a metal film containing an element selected from aluminum (Al), chromium (Cr), copper (Cu), tantalum (Ta), titanium (Ti), molybdenum (Mo), or tungsten (W), an alloy film containing these elements, and the like. A layered film including a plurality of films of these films may be used. For example, a layered film having a triple-layer structure of titanium film-aluminum film-titanium film, or a triple-layer structure of molybdenum film-aluminum film-molybdenum film can be used. Note that the source metal film is not limited to a triple-layer structure, but may have a single layer or a dual-layer structure, or a four or more-layered structure. Here, a layered film having a lower layer of a Ti film (thickness of 15 nm or more and 70 nm or less) and an upper layer of a Cu film (thickness of 200 nm or more and 400 nm or less) is used as the source metal film.

Step 2: Form Lower Insulating Layer 15 and Oxide Semiconductor Film 12'.

As illustrated in FIG. 4B, a first insulating film is deposited to cover the light blocking layer 14 and the source wiring line SL to form the lower insulating layer 15.

Examples of the lower insulating layer 15 appropriately include a silicon oxide ($SiO_2$) layer, a silicon nitride (SiNx) layer, a silicon oxynitride (SiOxNy;x>y) layer, a silicon nitride oxide (SiNxOy;x>y) layer, an aluminum oxide layer, a tantalum oxide layer, or the like. The lower insulating layer 15 may have a layered structure. Here, for example, a layered film having a lower layer of a silicon nitride (SiNx) layer (thickness of 50 nm or more and 600 nm or more) and an upper layer of a silicon oxide ($SiO_2$) layer (thickness of 50 nm or more and 600 nm or more) is formed as the lower insulating layer 15 by CVD. In a case that an oxide film such as a silicon oxide film is used as the lower insulating layer 15 (or, the top layer of the lower insulating layer 15, in a case that the lower insulating layer 15 has a layered structure), oxygen deficiency generated in the channel region 12c of the oxide semiconductor layer 12 that is subsequently formed can be reduced by the oxide film, and thus, lowering of the resistance of the channel region 12c can be suppressed.

Figure 4C:
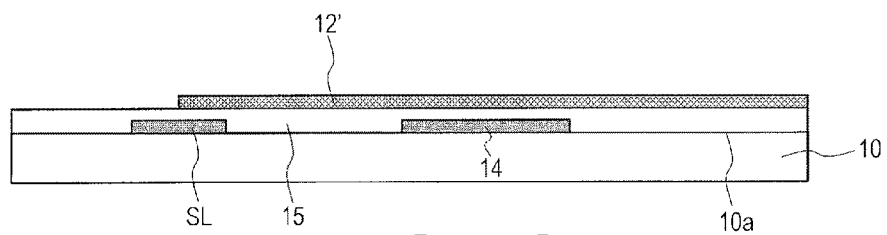
FIG. 4C is a process cross-sectional view illustrating an example of the manufacturing method of the active matrix substrate 1.

Next, as illustrated in FIG. 4C, an oxide semiconductor film 12' is deposited on the lower insulating layer 15, and then, the oxide semiconductor film 12' is patterned. Patterning of the oxide semiconductor film 12' is performed by sequentially performing a photolithography process (patterning of a resist), etching of the oxide semiconductor film 12', and peeling of the resist. The oxide semiconductor film 12' is, for example, an In—Ga—Zn—O based semiconductor film having a thickness of 15 nm or more and 200 nm or less that is formed by sputtering.

Step 3: Form Gate Insulating Layer 13, Gate Electrode GE, and Gate Wiring Line GL.

Figure 4D:
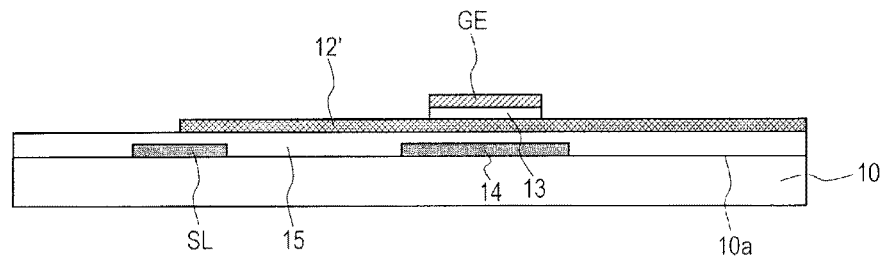
FIG. 4D is a process cross-sectional view illustrating an example of the manufacturing method of the active matrix substrate 1.

As illustrated in FIG. 4D, a second insulating film and a gate metal film (a second conductive film) are deposited in this order to cover the oxide semiconductor film 12', and then, the gate metal film and the second insulating film are pattered to form the gate insulating layer 13, the gate electrode GE, and the gate wiring line GL. Patterning of the gate metal film and the second insulating film is performed by sequentially performing a photolithography process (patterning of a resist), etching of the gate metal film, etching of the second insulating film, and peeling of the resist.

As the second insulating film, an insulating film similar to the lower insulating layer 15 (an insulating film illustrated as the lower insulating layer 15) can be used. In a case that an oxide film such as a silicon oxide film is used as the second insulating film, oxygen deficiency generated in the channel region 12c of the oxide semiconductor layer 12 can be reduced by the oxide film, and thus, lowering of the resistance of the channel region can be suppressed. Here, a silicon oxide ($SiO_2$) film having a thickness of 80 nm or more and 250 nm or less is formed as the second insulating film by CVD.

Examples the gate metal film include a metal film containing an element selected from aluminum (Al), chromium (Cr), copper (Cu), tantalum (Ta), titanium (Ti), molybdenum (Mo), or tungsten (W), an alloy film containing these elements, and the like. A layered film including a plurality of films of these films may be used. For example, a layered film having a triple-layer structure of titanium film-aluminum film-titanium film, or a triple-layer structure of molybdenum film-aluminum film-molybdenum film can be used. Note that the gate metal film is not limited to a triple-layer structure, but may have a single layer or a dual-layer structure, or a four or more-layered structure. Here, a layered film having a lower layer of a Ti film (thickness of 15 nm or more and 70 nm or less) and an upper layer of a Cu film (thickness of 200 nm or more and 400 nm or less) is formed as the gate metal film by sputtering.

Step 4: Lower Resistance of Oxide Semiconductor Film 12'.

Figure 5A:
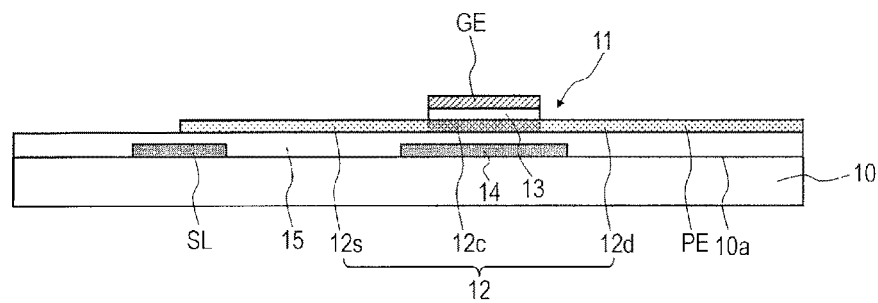
FIG. 5A is a process cross-sectional view illustrating an example of the manufacturing method of the active matrix substrate 1.

As illustrated in FIG. 5A, the resistance of a portion of the oxide semiconductor film 12' is lowered (or the portion is made conductive) to obtain the first low-resistive region 12s, the second low-resistive region 12d, and the pixel electrode PE. Here, plasma treatment is performed as a low-resistance treatment. This lowers a specific resistance of a region of the oxide semiconductor film 12' that does not overlap the gate electrode GE or the gate insulating layer 13 when viewed from the normal direction of the substrate plane, compared to a specific resistance of a region overlapping the gate electrode GE and the gate insulating layer 13 (channel region 12c) (for example, a sheet resistance is 200Ω/□ or less).

In the plasma treatment, a portion of the oxide semiconductor film 12' that is not covered by the gate electrode GE is exposed to a reductive plasma or a plasma containing a doping element (for example, argon plasma). This lowers the specific resistance near a surface of the exposed portion of the oxide semiconductor film 12'. Note that a Method and conditions of the low-resistance treatment are described in JP 2008-40343 A, for example. The entire contents of the disclosure of JP 2008-40343 A are incorporated herein by reference.

Step 5: Form Interlayer Insulating Layer 16 and Contact Hole CH.

Figure 5B:
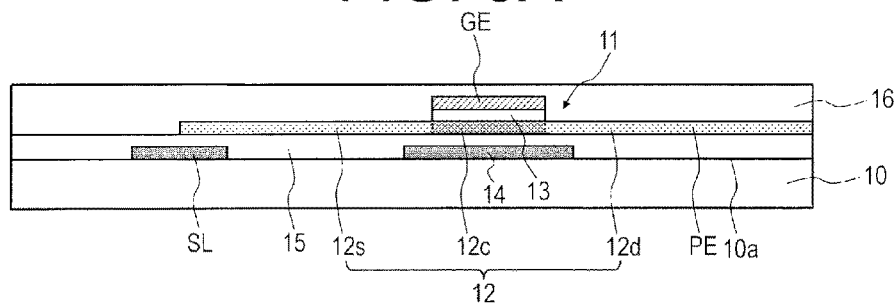
FIG. 5B is a process cross-sectional view illustrating an example of the manufacturing method of the active matrix substrate 1.

As illustrated in FIG. 5B, the interlayer insulating layer 16 (a third insulating film) 16 is deposited and formed to cover the oxide semiconductor layer 12, the gate electrode GE, and the gate wiring line GL. The interlayer insulating layer 16 can be formed as a single layer of or by layering an inorganic insulating layer such as a silicon oxide film, a silicon nitride film, a silicon oxynitride film, and a silicon nitride oxide film. A thickness of the inorganic insulating layer is 100 nm or more and 700 nm or less, for example. It is preferable to form the interlayer insulating layer 16 using an insulating film that reduces an oxide semiconductor such as a silicon nitride film, because a specific resistance of a region in contact with the interlayer insulating layer 16 (the first low-resistive region 12s, the second low-resistive region 12d, and the pixel electrode PE) can be maintained to be low. Here, a SiNx layer (thickness of 500 nm) is formed as the interlayer insulating layer 16 by CVD.

Figure 5C:
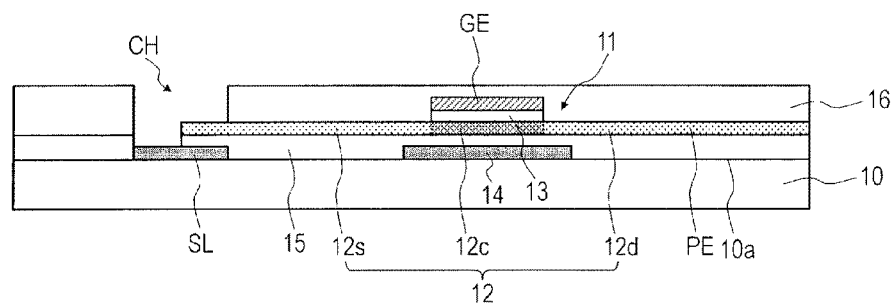
FIG. 5C is a process cross-sectional view illustrating an example of the manufacturing method of the active matrix substrate 1.

After that, as illustrated in FIG. 5C, the contact hole CH is formed in the interlayer insulating layer 16 and the lower insulating layer 15, the contact hole CH exposing a portion of the first low-resistive region 12s of the oxide semiconductor layer 12. Forming of the contact hole CH is performed by sequentially performing a photolithography process (patterning of a resist), etching of the interlayer insulating layer 16, etching of the lower insulating layer 15, and peeling of the resist.

Step 6: Form Common Electrode CE and Connection Electrode 17.

Figure 5D:
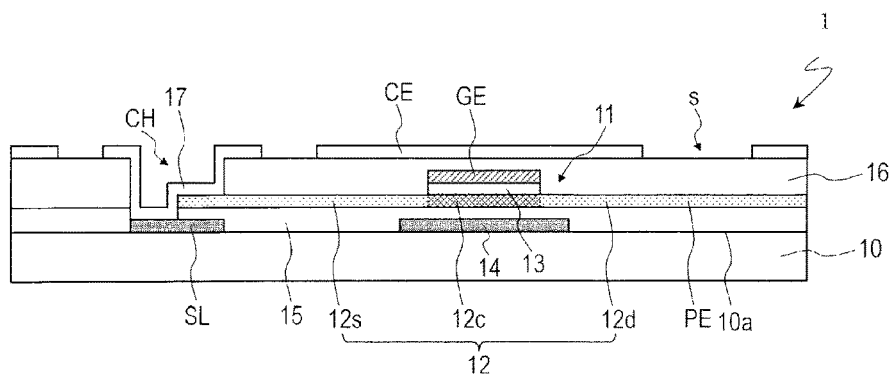
FIG. 5D is a process cross-sectional view illustrating an example of the manufacturing method of the active matrix substrate 1.

As illustrated in FIG. 5D, a transparent conductive film is deposited on the interlayer insulating layer 16, and then, the transparent conductive film is patterned to form the common electrode CE. At this time, patterning of the transparent conductive film causes the connection electrode 17 to be formed together with the common electrode CE, the connection electrode 17 connecting any one of the plurality of source wiring lines SL to the first low-resistive region 12s of the oxide semiconductor layer 12 within the contact hole CH. Patterning of the transparent conductive film is performed by sequentially performing a photolithography process (patterning of a resist), etching of the transparent conductive film, and peeling of the resist. Examples of a material of the transparent conductive film may include metal oxide such as ITO (indium-tin oxide), indium-zinc oxide, or ZnO. Here, an indium-zinc oxide film having a thickness of 20 nm or more and 300 nm or less is formed as the transparent conductive film by sputtering.

After that, the first alignment film is formed to cover the common electrode CE and the interlayer insulating layer 16. In this manner, the active matrix substrate 1 is manufactured.

The counter substrate 2 is prepared separately from preparing the active matrix substrate 1. After that, the active matrix substrate 1 and the counter substrate 2 are adhered to each other, the liquid crystal layer 3 is formed, and the like, to obtain the liquid crystal display device 100. The counter substrate 2 can be manufactured and the liquid crystal layer 3 can be formed by various known techniques, and thus, descriptions thereof will be omitted here.

The liquid crystal display device 100 according to the present embodiment can reduce the manufacturing processes to reduce the manufacturing costs, because the active matrix substrate 1 has the configuration described above. Hereinafter, the reason for the above is described in comparison to a liquid crystal display device 900 in a comparative example illustrated in FIG. 6 and FIG. 7.

Figure 6:
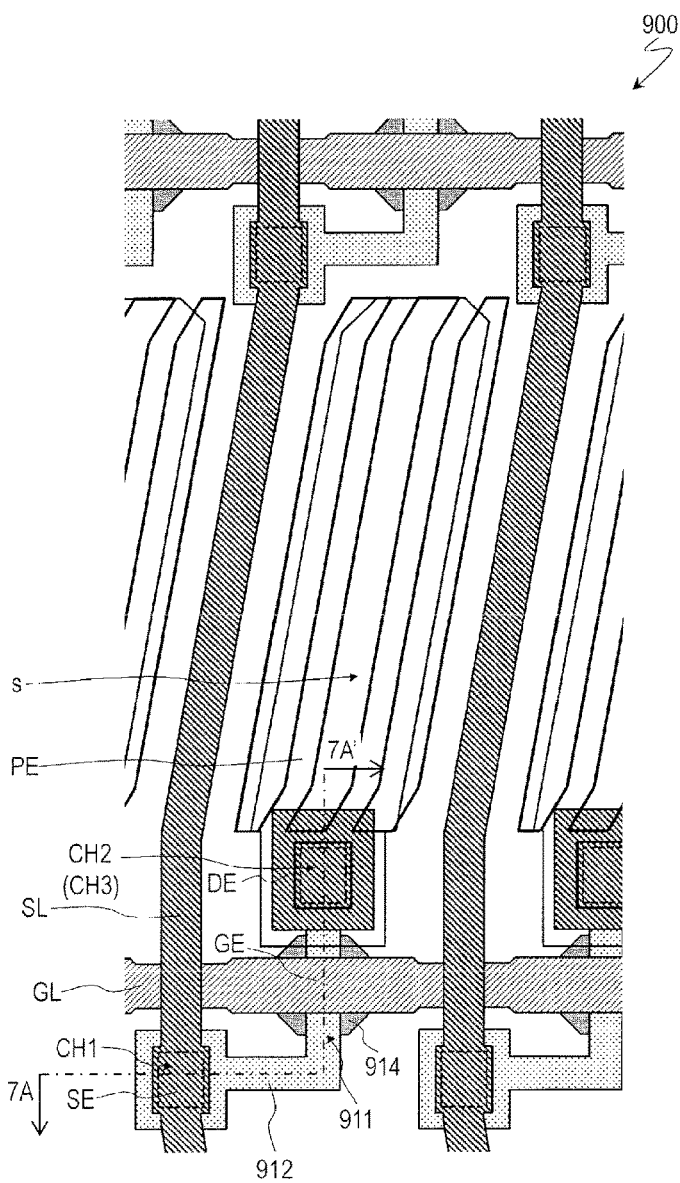
FIG. 6 is a plan view illustrating a liquid crystal display device 900 in a comparative example.
Figure 7:
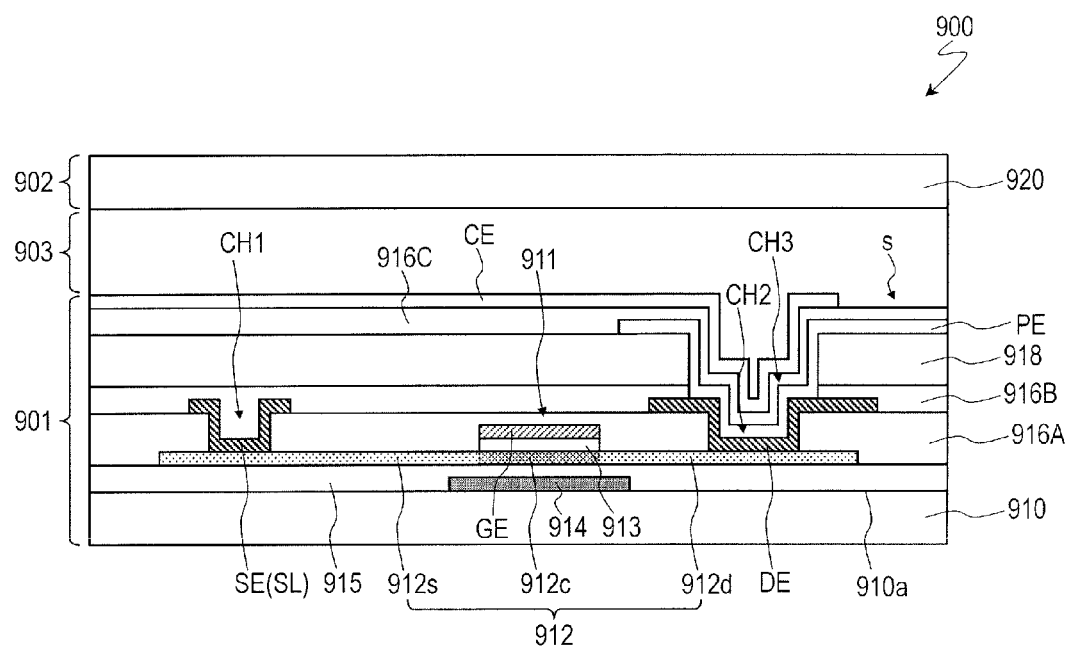
FIG. 7 is a cross-sectional view illustrating the liquid crystal display device 900, and illustrates a cross section taken along a line 7A-7A' in FIG. 6.

FIG. 6 is a plan view illustrating the liquid crystal display device 900. FIG. 7 is a cross-sectional view illustrating the liquid crystal display device 900, and illustrates a cross section taken along a line 7A-7A' in FIG. 6.

As illustrated in FIG. 7, the liquid crystal display device 900 includes an active matrix substrate 901, a counter substrate 902 arranged to face the active matrix substrate 901, and a liquid crystal layer 903 provided between the active matrix substrate 901 and the counter substrate 902. The liquid crystal display device 900 also includes a plurality of pixels arranged in a matrix.

The active matrix substrate 901 includes a first substrate 910 having a main surface 910a, pixel TFTs 911 each provided corresponding to each of the plurality of pixels, a plurality of gate wiring lines GL extending in the row direction, and a plurality of source wiring lines SL extending in the column direction, as illustrated in FIG. 6 and FIG. 7. Furthermore, the active matrix substrate 901 includes a plurality of light blocking layers 914, a lower insulating layer 915, a first interlayer insulating layer 916A, a second interlayer insulating layer 916B, an organic insulating layer 918, pixel electrodes PE, a third interlayer insulating layer 916C, and a common electrode CE.

The plurality of light blocking layers 914 are provided on the main surface 910a of the first substrate 910. Each of the plurality of light blocking layers 914 is disposed corresponding to each of the pixel TFTs 911. The lower insulating layer 915 is provided to cover the plurality of light blocking layers 914.

The pixel TFT 911 includes an oxide semiconductor layer 912 provided on the lower insulating layer 915, a gate insulating layer 913 provided on the oxide semiconductor layer 912, and a gate electrode GE provided to face the oxide semiconductor layer 912 with the gate insulating layer 913 interposed therebetween. The pixel TFT 911 further includes a source electrode SE electrically connected to the source wiring line SL, and a drain electrode DE electrically connected to the pixel electrode PE.

The oxide semiconductor layer 912 includes a channel region 912c, and a source region 912s and a drain region 912d that are positioned respectively on both sides of the channel region 912c. The channel region 912c overlaps the gate electrode GE when viewed from a normal direction of the main surface 910a of the first substrate 910 (the normal direction of the substrate plane). The light blocking layer 914 disposed corresponding to each pixel overlaps at least the channel region 912c when viewed from the normal direction of the substrate surface.

The plurality of gate wiring lines GL are formed from the conductive film (gate metal film) the same as the gate electrode GE. To be more specific, the gate electrode GE is integrally formed with any one of the plurality of gate wiring lines GL, and a portion of each gate wiring line GL overlapping the oxide semiconductor layer 912 functions as the gate electrode GE.

The first interlayer insulating layer 916A is provided to cover the oxide semiconductor layer 912, the gate electrode GE, and the gate wiring line GL. The plurality of source wiring lines SL are provided on the first interlayer insulating layer 916A.

The source electrode SE is electrically connected to the source region 912s of the oxide semiconductor layer 912. More specifically, the source electrode SE is connected to the source region 912s within a source contact hole CH1 formed in the first interlayer insulating layer 916A. The source electrode SE is integrally formed with any one of the plurality of source wiring lines SL, and a portion of each source wiring line SL overlapping the oxide semiconductor layer 912 functions as the source electrode SE.

The drain electrode DE is electrically connected to the drain region 912d of the oxide semiconductor layer 912. More specifically, the drain electrode DE is connected to the drain region 912d within a drain contact hole CH2 formed in the first interlayer insulating layer 916A.

The second interlayer insulating layer 916B is formed to cover the pixel TFT 911. The organic insulating layer 918 is formed on the second interlayer insulating layer 916B.

The pixel electrode PE is provided on the organic insulating layer 918. The pixel electrode PE is formed of a transparent conductive material (e.g., ITO or IZO). The pixel electrode PE is electrically connected to the drain electrode DE of the pixel TFT 911. More specifically, the pixel electrode PE is connected to the drain electrode DE within a pixel contact hole CH3 formed in the organic insulating layer 918 and the second interlayer insulating layer 916B.

The third interlayer insulating layer 916C is provided to cover the pixel electrode PE.

The common electrode CE is provided on the third interlayer insulating layer 916C. The common electrode CE is formed of a transparent conductive material (e.g., ITO or IZO). At least one slit s is formed in the common electrode CE per pixel.

A first alignment film (not illustrated) is provided on an outermost surface of the active matrix substrate 901 to come into contact with the liquid crystal layer 903. The first alignment film is a horizontal alignment film, and has the liquid crystal molecules aligned substantially parallel to a surface thereof in the no voltage applied state.

The counter substrate 902 includes a second substrate 920, and a color filter and a black matrix (both not illustrated) supported by the second substrate 920.

A second alignment film (not illustrated) is provided on an outermost surface of the counter substrate 902 to come into contact with the liquid crystal layer 903. The second alignment film is a horizontal alignment film, and has the liquid crystal molecules aligned substantially parallel to a surface thereof in the no voltage applied state.

Next, a manufacturing method of the active matrix substrate 901 of the liquid crystal display device 900 will be described with reference to FIG. 8, FIGS. 9A to 9D, FIGS. 10A to 10D, FIGS. 11A to 11C, and FIGS. 12A to 12C. FIG. 8 is a flowchart illustrating the manufacturing method of the active matrix substrate 901. Each of FIGS. 9A to 9D, FIGS. 10A to 10D, FIGS. 11A to 11C, and FIGS. 12A to 12C is a process cross-sectional view illustrating the manufacturing method of the active matrix substrate 901.

Step 1: Form Light Blocking Layer 914.

As illustrated in FIG. 9A, the light blocking layer 914 is formed on the main surface 910a of the first substrate 910. Specifically, first, a light blocking film is deposited on the main surface 910a of the first substrate 910 by sputtering, and then, the light blocking film is patterned such that the light blocking layer 914 can be formed. Patterning of the light blocking film is performed by sequentially performing a photolithography process (patterning of a resist), etching of the light blocking film, and peeling of the resist.

Step 2: Form Lower Insulating Layer 915 and Oxide Semiconductor Film 912'.

Figure 9B:
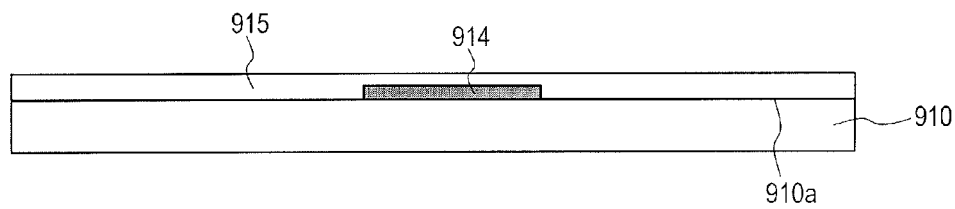
FIG. 9B is a process cross-sectional view illustrating an example of the manufacturing method of the active matrix substrate 901.

As illustrated in FIG. 9B, a first insulating film is deposited to cover the light blocking layer 914 to form the lower insulating layer 915.

Figure 9C:
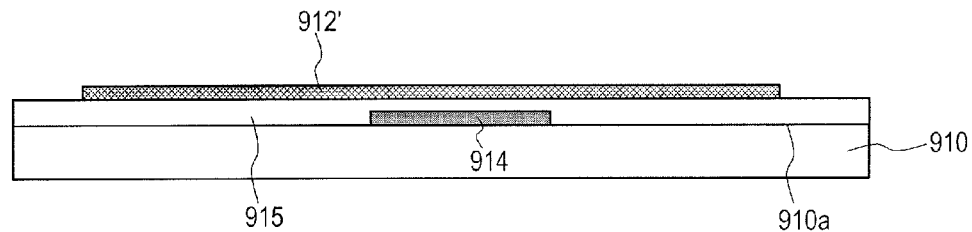
FIG. 9C is a process cross-sectional view illustrating an example of the manufacturing method of the active matrix substrate 901.

Next, as illustrated in FIG. 9C, an oxide semiconductor film 912' is deposited on the lower insulating layer 915, and then, the oxide semiconductor film 912' is patterned. Patterning of the oxide semiconductor film 912' is performed by sequentially performing a photolithography process (patterning of a resist), etching of the oxide semiconductor film 912', and peeling of the resist.

Step 3: Form Gate Insulating Layer 913, Gate Electrode GE, and Gate Wiring Line GL.

Figure 9D:
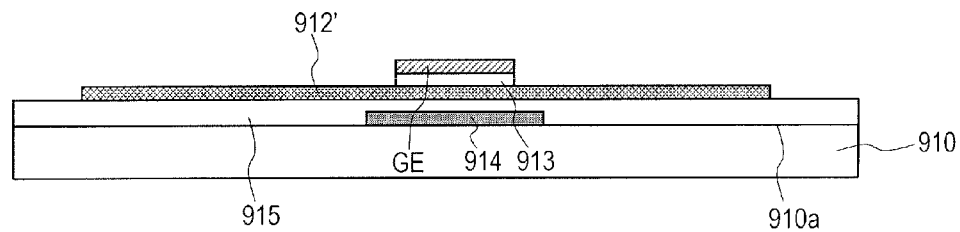
FIG. 9D is a process cross-sectional view illustrating an example of the manufacturing method of the active matrix substrate 901.

As illustrated in FIG. 9D, a second insulating film and a gate metal film are deposited in this order to cover the oxide semiconductor film 912', and then, the gate metal film and the second insulating film are pattered to form the gate insulating layer 913, the gate electrode GE, and the gate wiring line GL. Patterning of the gate metal film and the second insulating film is performed by sequentially performing a photolithography process (patterning of a resist), etching of the gate metal film, etching of the second insulating film, and peeling of the resist.

Step 4: Lower Resistance of Oxide Semiconductor Film 912'.

Figure 10A:
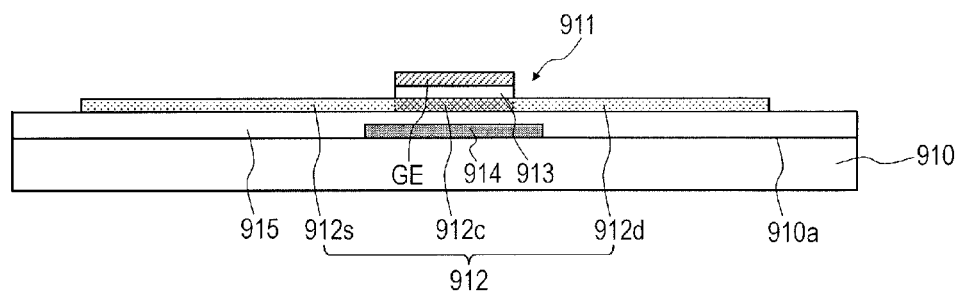
FIG. 10A is a process cross-sectional view illustrating an example of the manufacturing method of the active matrix substrate 901.

As illustrated in FIG. 10A, the resistance of a portion of the oxide semiconductor film 912' is lowered (or the portion is made conductive) by the plasma treatment to obtain the source region 912s and the drain region 912d.

Step 5: Form First Interlayer Insulating Layer 916A, Source Contact Hole CH1, and Drain Contact Hole CH2.

Figure 10B:
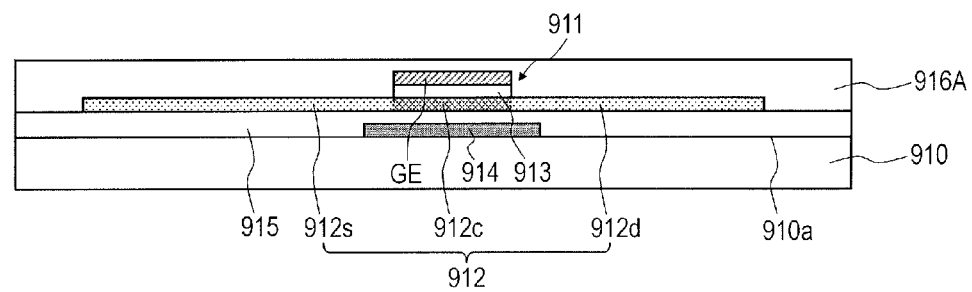
FIG. 10B is a process cross-sectional view illustrating an example of the manufacturing method of the active matrix substrate 901.

As illustrated in FIG. 10B, the first interlayer insulating layer (a third insulating film) 916A is deposited and formed to cover the oxide semiconductor layer 912, the gate electrode GE, and the gate wiring line GL.

Figure 10C:
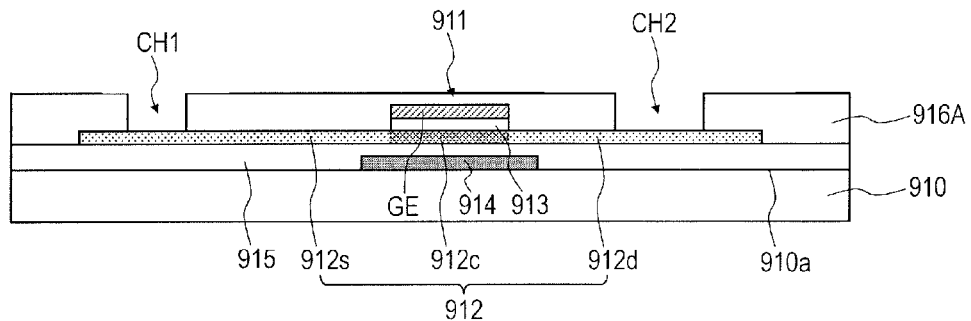
FIG. 10C is a process cross-sectional view illustrating an example of the manufacturing method of the active matrix substrate 901.

After that, as illustrated in FIG. 10C, the source contact hole CH1 and the drain contact hole CH2 are formed in the first interlayer insulating layer 916A, the source contact hole CH1 exposing a portion of the source region 912s of the oxide semiconductor layer 912, the drain contact hole CH2 exposing a portion of the drain region 912d. Forming of the source contact hole CH1 and the drain contact hole CH2 is performed by sequentially performing a photolithography process (patterning of a resist), etching of the first interlayer insulating layer 916A, and peeling of the resist.

Step 6: Form Source Electrode SE, Drain Electrode DE, and Source Wiring Line SL.

Figure 10D:
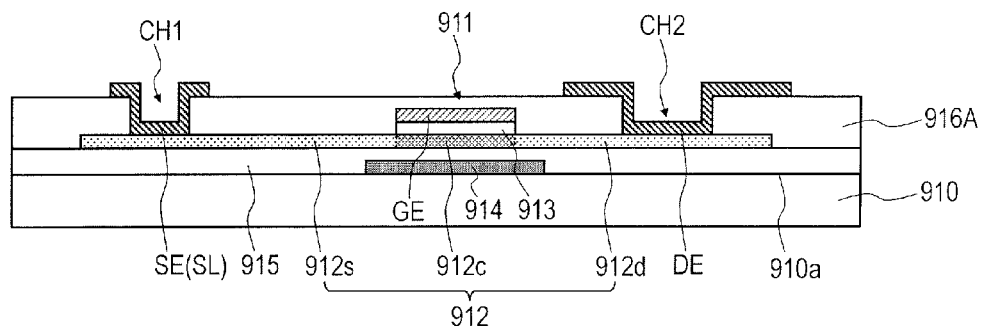
FIG. 10D is a process cross-sectional view illustrating an example of the manufacturing method of the active matrix substrate 901 in the comparative example.

As illustrated in FIG. 10D, a source metal film is deposited on the first interlayer insulating layer 916A, and then, the source metal film is patterned to form the source electrode SE, the drain electrode DE, and the source wiring line SL. Patterning of the source metal film is performed by sequentially performing a photolithography process (patterning of a resist), etching of the source metal film, and peeling of the resist.

Step 7: Form Second Interlayer Insulating Layer 916B, Organic Insulating Layer 918, and Pixel Contact Hole CH3.

Figure 11A:
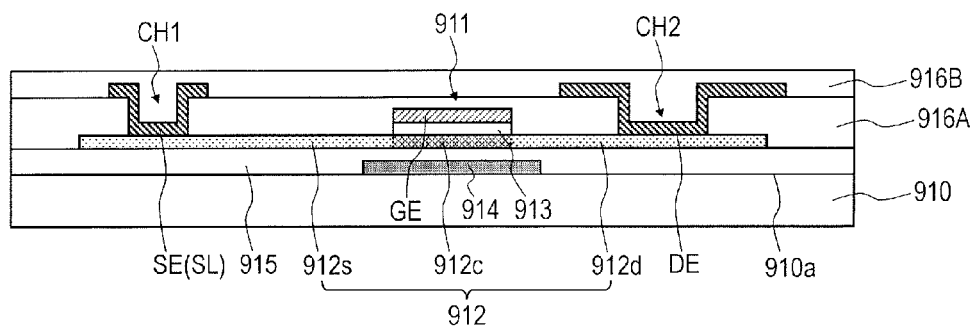
FIG. 11A is a process cross-sectional view illustrating an example of the manufacturing method of the active matrix substrate 901.

As illustrated in FIG. 11A, the second interlayer insulating layer (a fourth insulating film) 916B is deposited and formed to cover the pixel TFT 911.

Figure 11B:
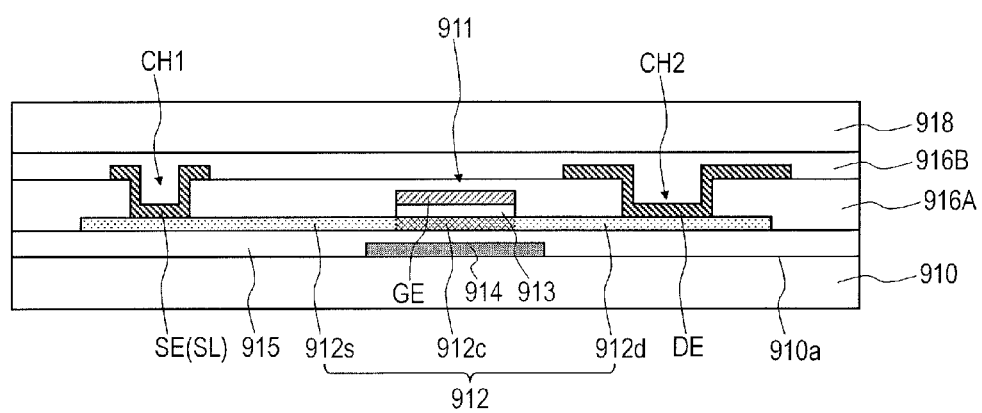
FIG. 11B is a process cross-sectional view illustrating an example of the manufacturing method of the active matrix substrate 901.

Next, as illustrated in FIG. 11B, the organic insulating layer (a fifth insulating film) 918 is deposited (applied) and formed on the second interlayer insulating layer 916B.

Figure 11C:
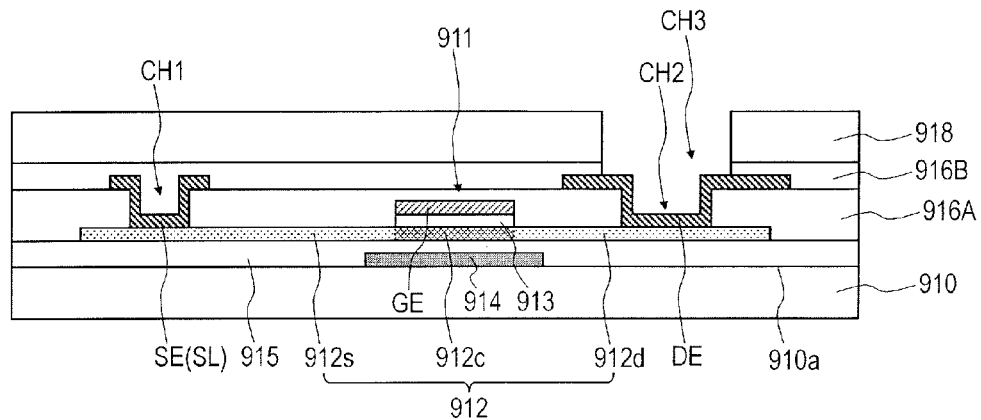
FIG. 11C is a process cross-sectional view illustrating an example of the manufacturing method of the active matrix substrate 901.

After that, as illustrated in FIG. 11C, the pixel contact hole CH3 is formed in the organic insulating layer 918 and the second interlayer insulating layer 916B to expose a portion of the drain electrode DE. Forming of the pixel contact hole CH3 is performed by sequentially performing patterning of the organic insulating layer 918 using a halftone mask, ashing of the organic insulating layer 918, etching of the second interlayer insulating layer 916B, and peeling of the resist. In the example illustrated in FIG. 8, the lower insulating layer 915 is etched between the etching of the second interlayer insulating layer 916B and the peeling of the resist.

Step 8: Form Pixel Electrode PE.

Figure 12A:
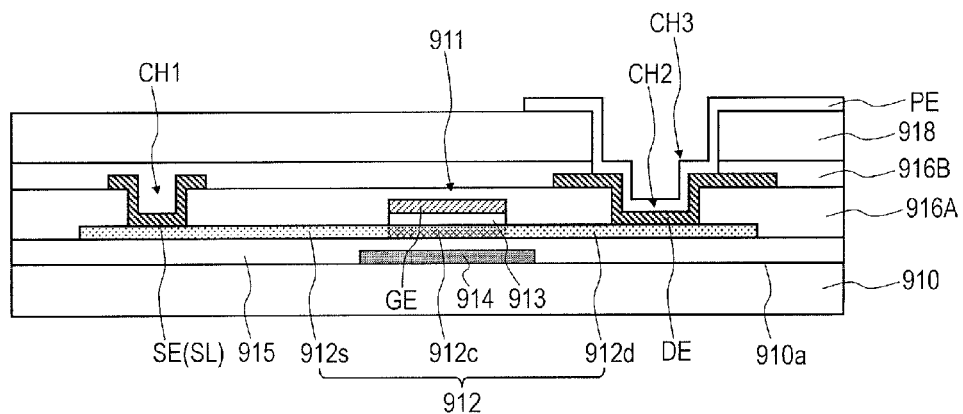
FIG. 12A is a process cross-sectional view illustrating an example of the manufacturing method of the active matrix substrate 901.

As illustrated in FIG. 12A, a first transparent conductive film is deposited on the organic insulating layer 918, and then, the first transparent conductive film is patterned to form the pixel electrode PE. Patterning of the first transparent conductive film is performed by sequentially performing a photolithography process (patterning of a resist), etching of the first transparent conductive film, and peeling of the resist.

Step 9: Form Third Interlayer Insulating Layer 916C.

Figure 12B:
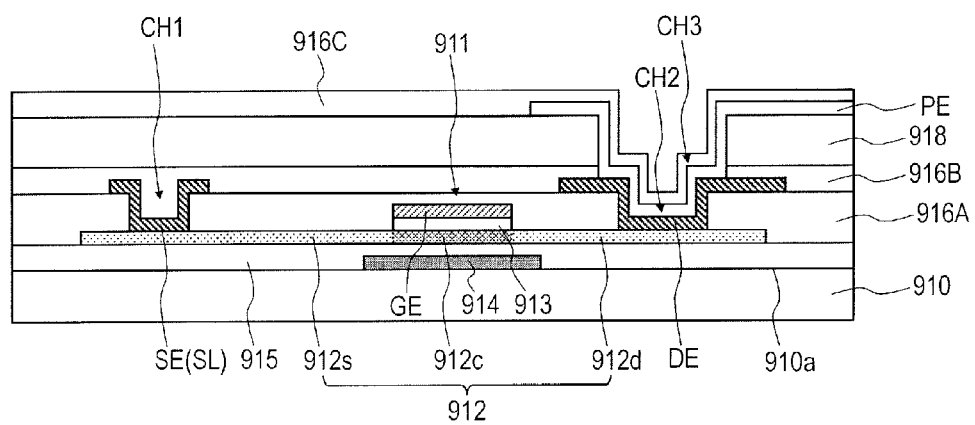
FIG. 12B is a process cross-sectional view illustrating an example of the manufacturing method of the active matrix substrate 901.

As illustrated in FIG. 12B, the third interlayer insulating layer (a sixth insulating film) 916C is deposited to cover the pixel electrode PE, and then, the third interlayer insulating layer 916C is patterned. Patterning of the third interlayer insulating layer 916C is performed by sequentially performing a photolithography process (patterning of a resist), etching of the third interlayer insulating layer 916C, and peeling of the resist.

Step 10: Form Common Electrode CE.

Figure 12C:
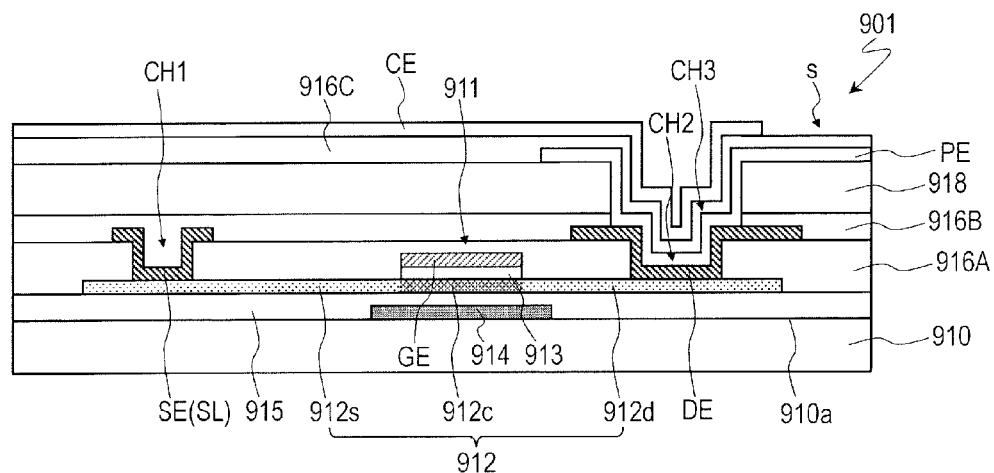
FIG. 12C is a process cross-sectional view illustrating an example of the manufacturing method of the active matrix substrate 901.

As illustrated in FIG. 12C, a second transparent conductive film is deposited on the third interlayer insulating layer 916C, and then, the second transparent conductive film is patterned to form the common electrode CE. Patterning of the second transparent conductive film is performed by sequentially performing a photolithography process (patterning of a resist), etching of the second transparent conductive film, and peeling of the resist.

After that, the first alignment film is formed to cover the common electrode CE. In this manner, the active matrix substrate 901 is manufactured.

As described above, in the liquid crystal display device 900 in the comparative example, the manufacturing processes for the active matrix substrate 901 are many, and thus, the manufacturing costs are increased. This comes from that, in the liquid crystal display device 900 in the FFS mode, two layers of transparent electrodes (the pixel electrode PE and the common electrode CE) are needed which are disposed one above the other with the insulating layer (the third interlayer insulating layer 916C) interposed therebetween, and the oxide semiconductor TFT 911 having the top gate structure needs the multilayer structure of the light blocking layer 914, the oxide semiconductor layer 912, the gate wiring line GL, the source wiring line SL, and the like. The multilayer structure causes the complex planar design to make it difficult to obtain a high aperture ratio.

In contrast, the liquid crystal display device 100 according to the present embodiment has the following configurations [A], [B], and [C].

[A] The plurality of source wiring lines SL are located between the main surface 10a of the first substrate 10 and the lower insulating layer 15, and are formed from the conductive film the same as the plurality of light blocking layers 14.

[B] The pixel electrode PE is formed from the oxide film the same as the oxide semiconductor layer 12, and is continuous with the second low-resistive region 12d in the oxide semiconductor layer 12.

[C] The active matrix substrate 1 includes the connection electrode 17 formed from the transparent conductive film the same as the common electrode CE, the connection electrode 17 connecting any one of the plurality of source wiring lines SL to the first low-resistive region 12s of the oxide semiconductor layer 12.

As can be seen from the description with referred to FIG. 3 and the like, the manufacturing processes of the active matrix substrate 1 can be reduced to reduce the manufacturing costs. For example, in manufacturing the active matrix substrate 901 of the liquid crystal display device 900 in the comparative example, nine photomasks are required, whereas in the example illustrated in FIG. 3, the number of required photomasks can be reduced to five. In this way, the number of photomasks can be significantly reduced, so the manufacturing costs can be reduced. The yield can be increased because of the smaller number of layers (that is, the short manufacturing flow), which also allows the manufacturing costs to be reduced.

Figure 13A:
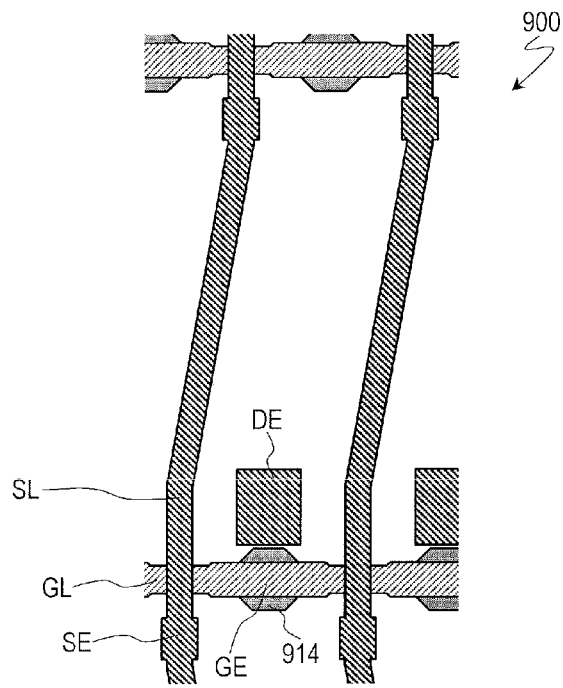
FIG. 13A is a plan view illustrating only a layer having light blocking properties among constituent elements of the active matrix substrate 901 (a layer formed of a metal material) in the liquid crystal display device 900.
Figure 13B:
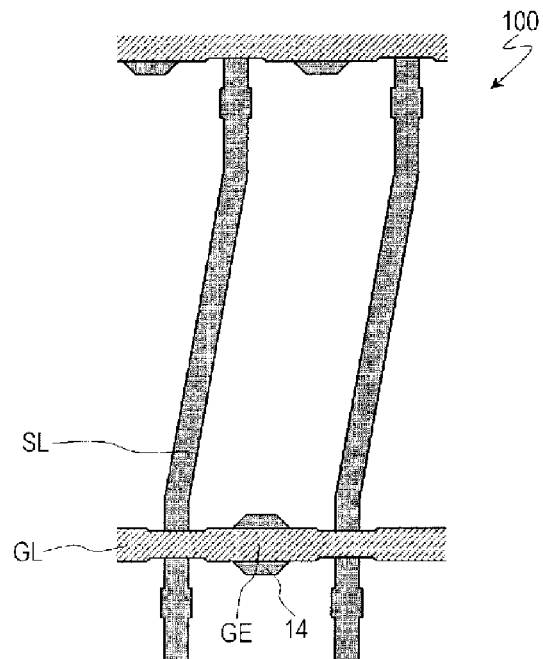
FIG. 13B is a plan view illustrating only a layer having light blocking properties among constituent elements of the active matrix substrate 1 (a layer formed of a metal material) in the liquid crystal display device 100.

Since the configuration [B] eliminates the need for the pixel contact hole (the contact hole connecting the drain electrode and the pixel electrode of the pixel TFT), an aperture ratio can be improved. FIGS. 13A and 13B illustrate only layers having light blocking properties (layers formed of a metal material) among constituent elements of the active matrix substrates 901 and 1 of the liquid crystal display device 900 in the comparative example and the liquid crystal display device 100 in the present embodiment, respectively.

As can be seen from a comparison between FIGS. 13A and 13B, in the liquid crystal display device 100, the pixel contact hole is not present and the drain electrode is unnecessary, and thus, a proportion of an area occupied by the layer having light blocking properties in the pixel (referred to as a "metal occupancy ratio") is smaller than the liquid crystal display device 900 in the comparative example. As a result, the aperture ratio can be improved. When the metal occupancy ratios of the liquid crystal display device 900 in the comparative example and the liquid crystal display device 100 in the present embodiment are calculated for pixels with a pitch of 25 µm in the row direction and a pitch of 75 µm in the column direction, the metal occupancy ratio of the liquid crystal display device 900 in the comparative example is 26.7%, whereas the metal occupancy ratio of the liquid crystal display device 100 in the present embodiment is 21.2%. In this manner, in the liquid crystal display device 100 in the present embodiment, the metal occupancy ratio can be reduced, and thus, the aperture ratio is improved.

Furthermore, in the liquid crystal display device 100 according to the present embodiment, when viewed from the normal direction of the substrate plane, the oxide semiconductor layer 12 overlaps a substantial half of a region of the source wiring line SL located within the contact hole CH (specifically, 40% or more and 60% or less of the region of the source wiring line SL located within the contact hole CH). By doing so, an area of the region (connecting portion) where the connection is made by the connection electrode 17 can be reduced to further improve the aperture ratio.

Figure 14A:
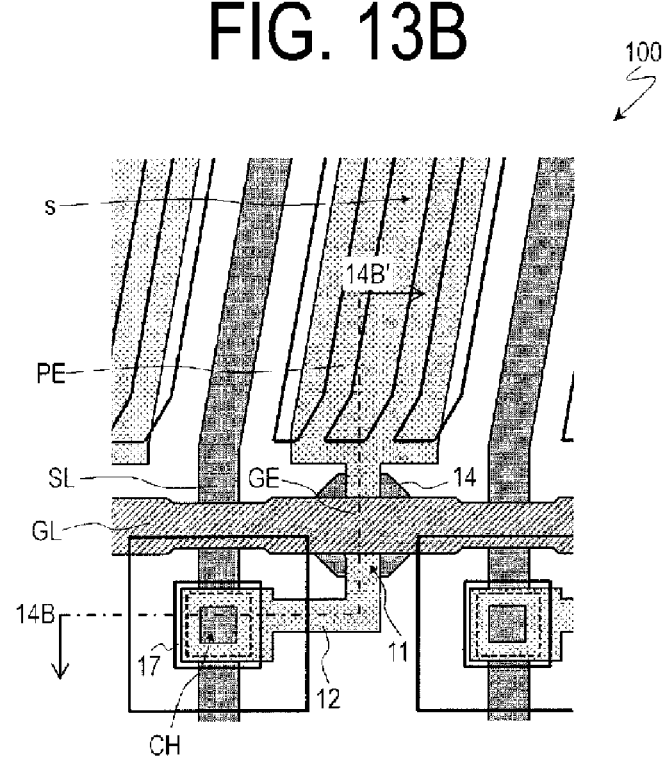
FIG. 14A is a plan view illustrating another example of a positional relationship between an oxide semiconductor layer 12 and a source wiring line SL within a contact hole CH.
Figure 14B:
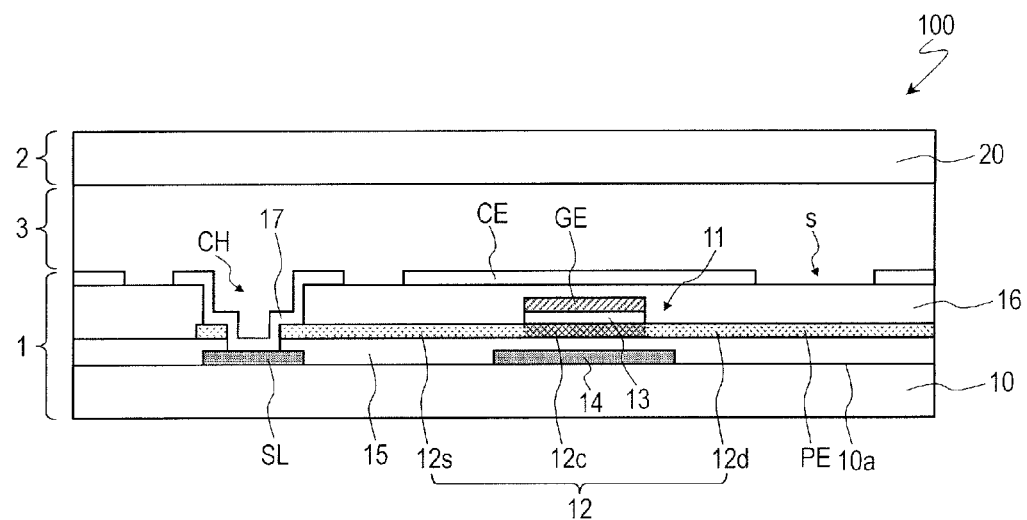
FIG. 14B is a cross-sectional view taken along a line 14B-14B' in FIG. 14A.

Note that although FIGS. 2A and 2B illustrate the example in which the oxide semiconductor layer 12 overlaps a right half of the source wiring line SL within the contact hole CH and does not overlap a left half, the positional relationship between the oxide semiconductor layer 12 and the source wiring line SL within the contact hole CH is not limited to this example. For example, the oxide semiconductor layer 12 may overlap the source wiring line SL within the contact hole CH as illustrated in FIGS. 14A and 14B. In the example illustrated in FIGS. 14A and 14B, the oxide semiconductor layer 12 overlaps the source wiring line SL near the entire edge of the contact hole CH and does not overlap the source wiring line SL near the center of the contact hole CH when viewed from the normal direction of the substrate plane.

Second Embodiment

Figure 15:
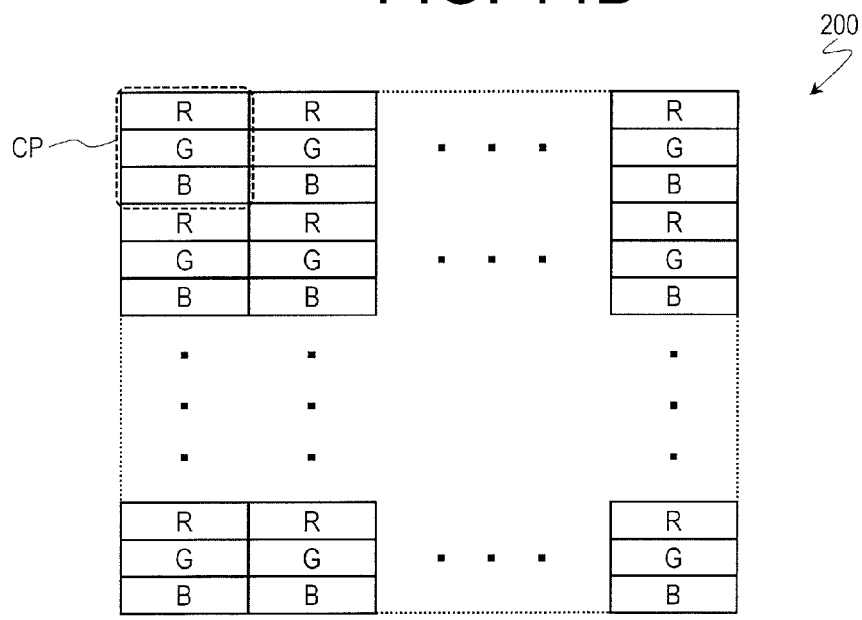
FIG. 15 is a diagram illustrating a pixel arrangement of a liquid crystal display device 200 according to an embodiment of the disclosure.
Figure 16A:
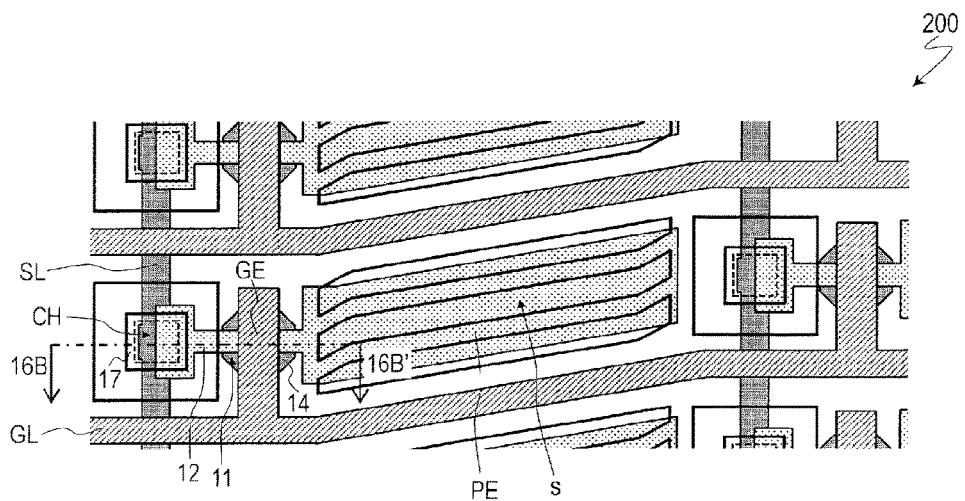
FIG. 16A is a plan view schematically illustrating the liquid crystal display device 200.
Figure 16B:
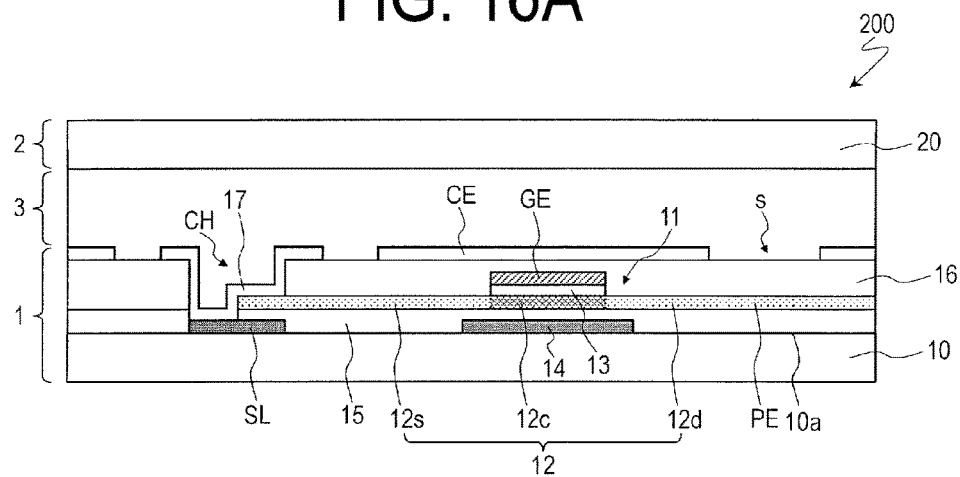
FIG. 16B is a cross-sectional view schematically illustrating the liquid crystal display device 200, and illustrates a cross section taken along a line 16B-16B' in FIG. 16A.

A liquid crystal display device 200 according to the present embodiment will be described with reference to FIG. 15 and FIGS. 16A and 16B. FIG. 15 is a diagram illustrating a pixel arrangement of the liquid crystal display device 200. FIGS. 16A and 16B are a plan view and a cross-sectional view, respectively, schematically illustrating the liquid crystal display device 200. FIG. 16B illustrates a cross section taken along a line 16B-16B' in FIG. 16A.

As illustrated in FIG. 15, the liquid crystal display device 200 includes a plurality of pixels arranged in a matrix including a plurality of rows and a plurality of columns. The plurality of pixels include red pixels R, green pixels G, and blue pixels B. The plurality of pixels constitute a plurality of color display pixels CP. Each of the plurality of color display pixels CP is constituted by three pixels that exhibit colors different from each other, namely, the red pixel R, the green pixel G, and the blue pixel B. In each of the color display pixels CP, the red pixel R, the green pixel G, and the blue pixel B are arranged in the column direction. The pixel arrangement illustrated in FIG. 15 may be referred to as a "horizontal stripe arrangement".

As illustrated in FIGS. 16A and 16B, the liquid crystal display device 200 according to the present embodiment has the configurations [A], [B], and [C] already described above, similar to the liquid crystal display device 100 in the first embodiment. Specifically, the plurality of source wiring lines SL are located between the main surface 10a of the first substrate 10 and the lower insulating layer 15, and are formed from the conductive film the same as the plurality of light blocking layers 14. The pixel electrode PE is formed from the oxide film the same as the oxide semiconductor layer 12, and is continuous with the second low-resistive region 12d in the oxide semiconductor layer 12. Furthermore, the active matrix substrate 1 includes the connection electrode 17 formed from the transparent conductive film the same as the common electrode CE, the connection electrode 17 connecting any one of the plurality of source wiring lines SL to the first low-resistive region 12s of the oxide semiconductor layer 12.

Therefore, as described with respect to the liquid crystal display device 100 in the first embodiment, the manufacturing processes of the active matrix substrate 1 can be reduced to reduce the manufacturing costs and improve the aperture ratio. The liquid crystal display device 200 in the present embodiment may be manufactured by a method similar to the manufacturing method of the liquid crystal display device 100 in the first embodiment.

In the liquid crystal display device 200 in the present embodiment, the horizontal stripe arrangement is adopted. For this reason, the number of the gate wiring lines GL extending in the row direction is three times the number of the gate wiring lines GL in the liquid crystal display device 100 in the first embodiment, and the number of the source wiring lines SL extending in the column direction is ⅓ of the number of the source wiring lines SL in the liquid crystal display device 100 in the first embodiment. This can further reduce the manufacturing costs in a case that the GDM circuit is provided as the gate wiring line drive circuit in the active matrix substrate 1. This point will be described below with reference to FIGS. 17A and 17B.

Figure 17A:
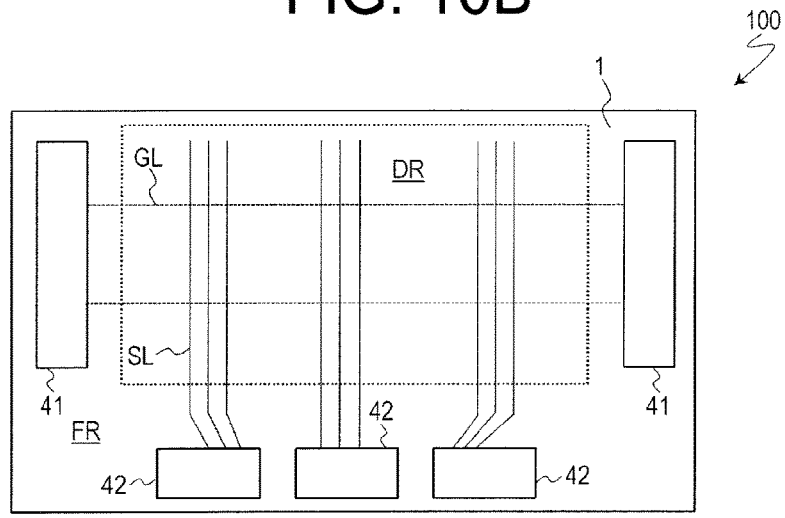
FIG. 17A is a plan view illustrating a display region DR and a peripheral region FR included in the liquid crystal display device 100.
Figure 17B:
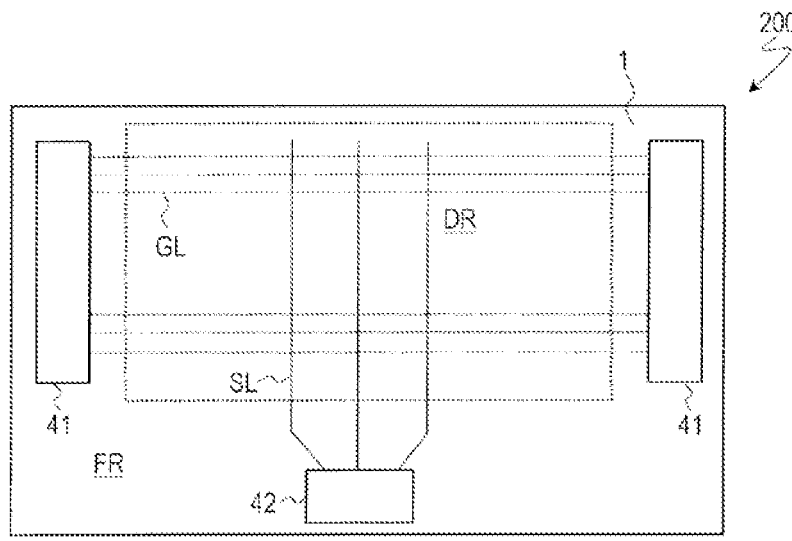
FIG. 17B is a plan view illustrating a display region DR and a peripheral region FR included in the liquid crystal display device 200.

Each of the liquid crystal display device 100 illustrated in FIG. 17A and the liquid crystal display device 200 illustrated in FIG. 17B includes a display region DR and a peripheral region FR. The display region DR is a region defined by a plurality of pixels. The peripheral region FR surrounds the display region DR and may be referred to as a "frame region".

As illustrated in FIGS. 17A and 17B, a gate wiring line drive circuit 41 that drives the plurality of gate wiring lines GL, and a source wiring line drive circuit 42 that drives the plurality of source wiring lines SL are arranged in the peripheral region FR. The gate wiring line drive circuit 41 is monolithically formed on the first substrate 10 of the active matrix substrate 1. In other words, the gate wiring line drive circuit 41 is a GDM circuit. The source wiring line drive circuit 42 is mounted to the active matrix substrate 1.

As described above, in the liquid crystal display device 200, the horizontal stripe arrangement is adopted, so the number of the source wiring lines SL may be ⅓ of the number of the source wiring lines SL of the liquid crystal display device 100. Therefore, in the liquid crystal display device 200, the number of source wiring line drive circuits 42 mounted can be reduced to ⅓ compared to the liquid crystal display device 100. As a result, the manufacturing costs can be further reduced.

Note that in the liquid crystal display device 200 in the present embodiment, the number of the gate wiring lines GL is tripled, so a time taken to write to the pixels is approximately ⅓. However, since the pixel TFT 11 has the top gate structure with high current supply performance, writing to pixels may be suitably performed in a relatively short time.

Figure 18:
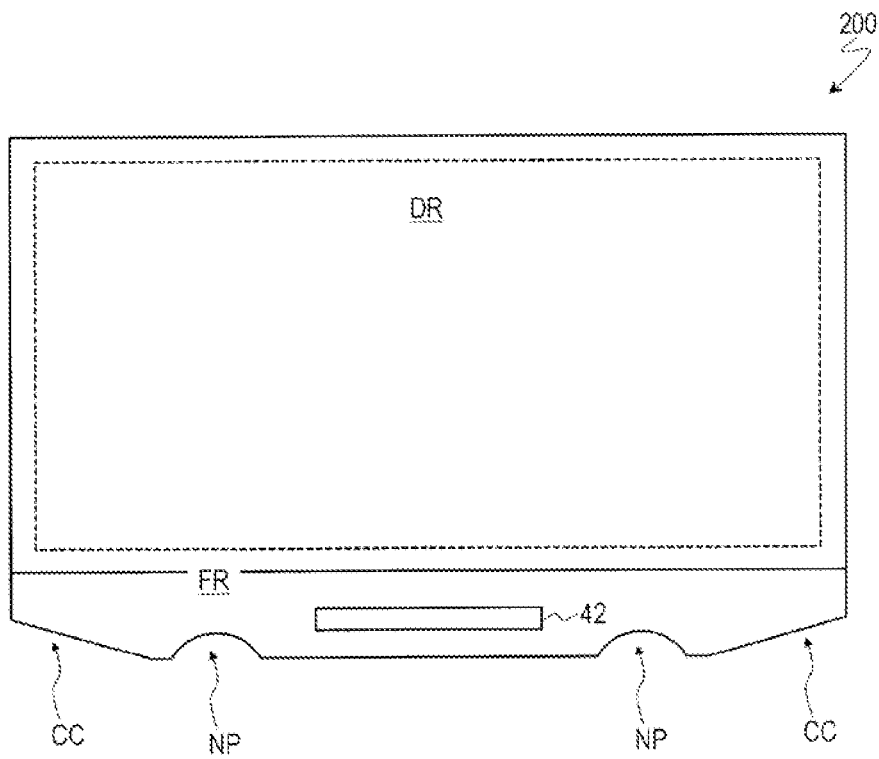
FIG. 18 is a diagram illustrating a configuration of the liquid crystal display device 200 in which a notch NP and a corner cut CC are provided in the peripheral region FR.

In the liquid crystal display device 200 in the present embodiment, an area occupied by the source wiring line drive circuit 42 in the peripheral region FR can be reduced, so the degree of freedom of an outline of the liquid crystal display device 200 increases. For example, as illustrated in FIG. 18, notches NP and corner cuts CC are easy to provide in the peripheral region FR (that is, the peripheral region FR is easy to partially cut out). Note that the number and shape of notches NP and corner cuts CC are not limited to those illustrated here.

Third Embodiment

Figure 19A:
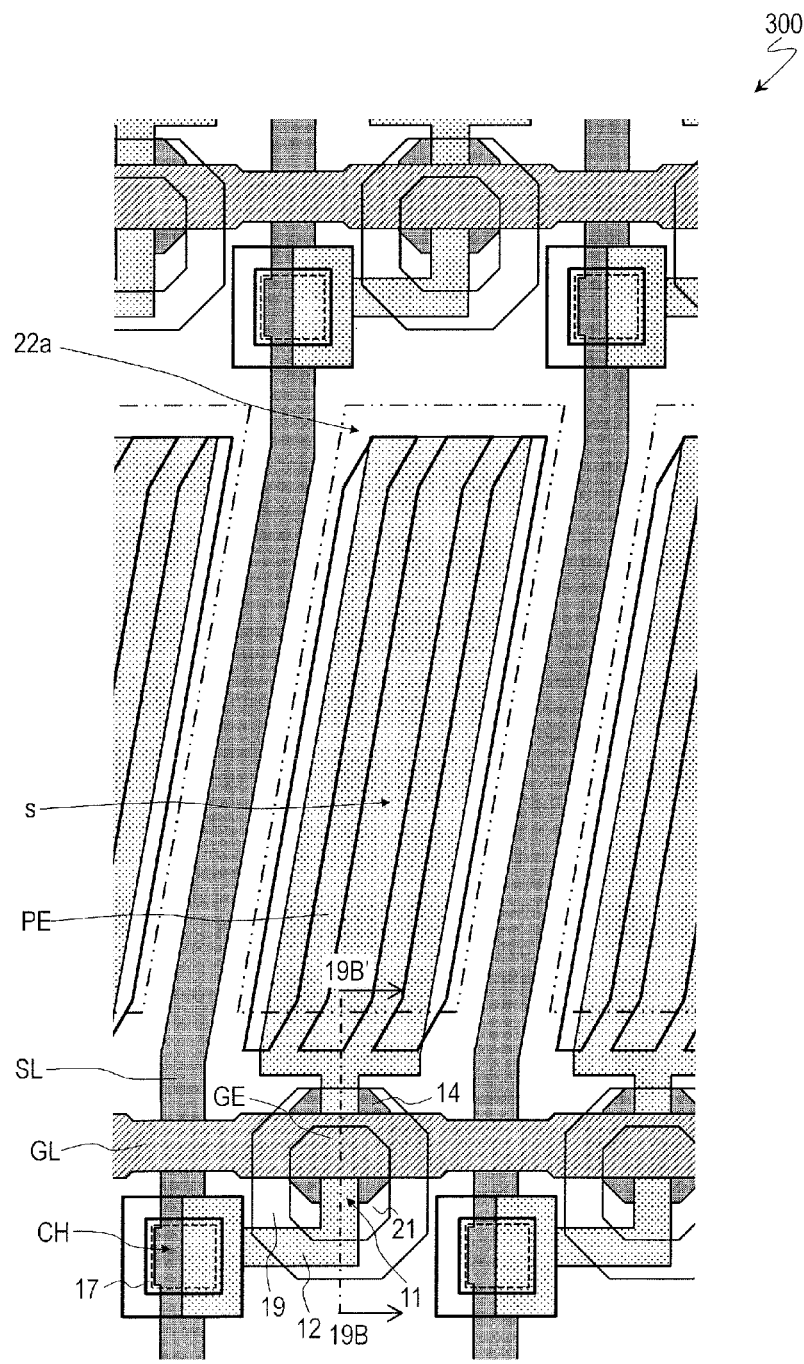
FIG. 19A is a plan view schematically illustrating a liquid crystal display device 300 according to an embodiment of the disclosure.
Figure 19B:
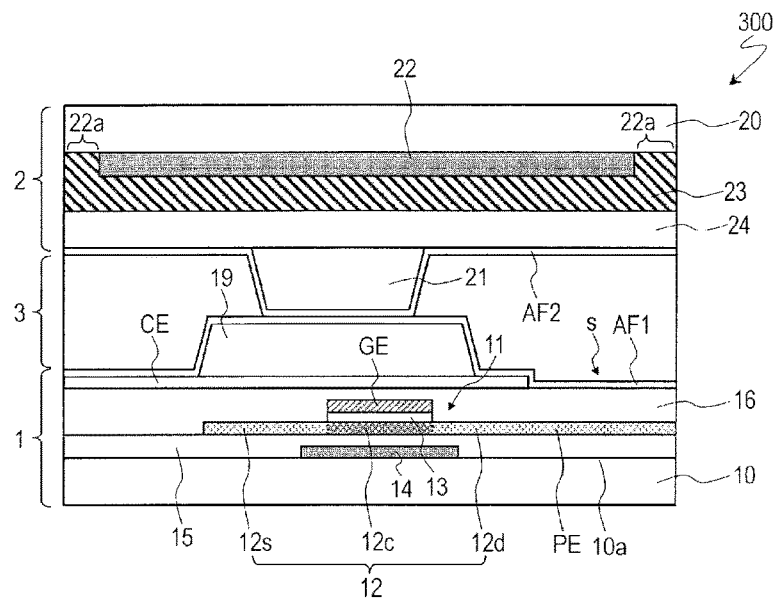
FIG. 19B is a cross-sectional view schematically illustrating the liquid crystal display device 300, and illustrates a cross section taken along a line 19B-19B' in FIG. 19A.

A liquid crystal display device 300 according to the present embodiment will be described with reference to FIGS. 19A and 19B. FIGS. 19A and 19B are a plan view and a cross-sectional view, respectively, schematically illustrating the liquid crystal display device 300. FIG. 19B illustrates a cross section taken along a line 19B-19B' in FIG. 19A.

The liquid crystal display device 300 in the present embodiment differs from the liquid crystal display device 100 in the first embodiment in that the active matrix substrate 1 includes a plurality of protruding portions 19 formed from an organic insulating material. A more specific description will be given below.

As illustrated in FIGS. 19A and 19B, the counter substrate 2 of the liquid crystal display device 300 includes the second substrate 20 and a plurality of columnar spacers 21 provided on the second substrate 20. In the example illustrated in FIG. 19B, the counter substrate 2 further includes a black matrix 22, a color filter layer 23, and a flattened layer 24.

The black matrix 22 is formed from a material having light blocking properties. In FIG. 19A, an outline of an opening 22a of the black matrix 22 (a region where the light blocking material is removed) is indicated by a dash-double-dot line. In the following, the region defined by the opening 22a of the black matrix 22 in a pixel is also referred to as a "pixel opening".

The color filter layer 23 typically includes a red color filter, a blue color filter, and a green color filter.

The flattened layer 24 is formed to cover the black matrix 22 and the color filter layer 23. The flattened layer 24 is formed from, for example, a resin material.

The plurality of columnar spacers 21 are provided on the flattened layer 24. The columnar spacer 21 is formed from a photosensitive resin material, for example.

The active matrix substrate 1 of the liquid crystal display device 300 includes a plurality of protruding portions 19 formed from an organic insulating material. The plurality of protruding portion 19 are provided on the common electrode CE and are positioned in a layer above the common electrode CE. When viewed from the normal direction of the substrate plane, each of the plurality of protruding portions 19 overlaps each of the plurality of columnar spacers 21. As a result, each protruding portion 19 functions as a pedestal for the columnar spacer 21.

The columnar spacer 21 is disposed not to overlap the pixel opening. Therefore, the protruding portion 19 is also disposed not to overlap the pixel opening.

FIG. 19B illustrates a first alignment film AF1 formed on an outermost surface of the active matrix substrate 1 and a second alignment film AF2 formed on an outermost surface of the counter substrate 2.

A step of forming the protruding portion 19 is performed after the step of forming the interlayer insulating layer 16 and the contact hole CH (STEP 5 illustrated in FIG. 3), and before the step of forming the common electrode CE and the connection electrode 17 (STEP 6 illustrated in FIG. 3). Forming of the protruding portion 19 is performed by depositing (applying) an organic insulating film on the common electrode CE and on the interlayer insulating layer 16, and then, patterning the organic insulating film.

In the liquid crystal display device 300 in the present embodiment, since the active matrix substrate 1 includes the protruding portions 19 as described above, a display quality degradation caused by the columnar spacer 21 rubbing on the first alignment film AF1 can be suppressed. This point will be described below with reference to FIGS. 20A and 20B.

Figure 20A:
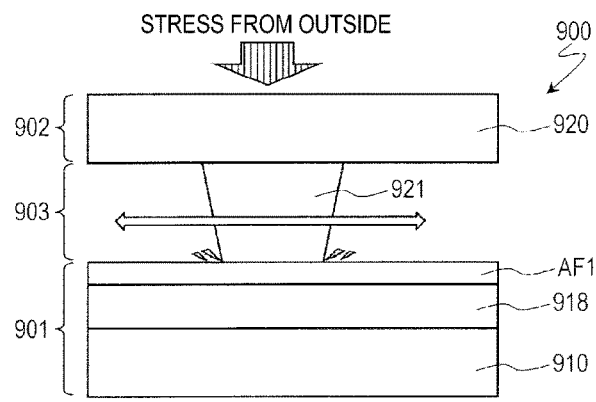
FIG. 20A is a diagram for describing a reason why a display quality degradation caused by a columnar spacer 921 occurs in the liquid crystal display device 900.

FIG. 20A illustrates a cross-sectional structure of the liquid crystal display device 900 in the comparative example, and illustrates a columnar spacer 921 included in the counter substrate 902. Note that in FIG. 20A, some constituent elements are not illustrated for ease to understand. Specifically, illustrated are the first substrate 910, the organic insulating layer 918, and the first alignment film AF1 among the constituent elements of the active matrix substrate 901, and the second substrate 920 and the columnar spacer 921 among the constituent elements of the counter substrate 902.

In the liquid crystal display device 900 in the comparative example illustrated in FIG. 20A, in a case that a stress is applied from the outside to the counter substrate 902, the columnar spacer 921 may move in the horizontal direction in a state of being abutted against the first alignment film AF1 to rub or scratch the first alignment film AF1, causing an alignment failure. In a case that the alignment failure occurs in the pixel opening, the display quality degrades. In a case that a region where the alignment failure may occur is light-blocked by the black matrix or the like in order to prevent the display quality from degrading, the aperture ratio is greatly impaired.

Figure 20B:
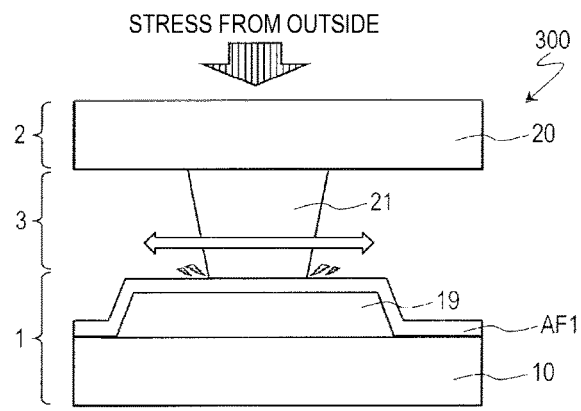
FIG. 20B is a diagram for describing a reason why a display quality degradation caused by a columnar spacer 21 is suppressed in the liquid crystal display device 300.

In contrast, in the liquid crystal display device 300 in the present embodiment illustrated in FIG. 20B, in a case that a stress is applied from the outside to the counter substrate 2, the columnar spacer 21 may rub or scratch a portion of the first alignment film AF1 positioned on the protruding portion 19, but is unlikely to rub or scratch a portion of the first alignment film AF1 positioned in the pixel opening. This is because the portion of the first alignment film AF1 positioned in the pixel opening is lower than the portion positioned on the protruding portion 19. As a result, the display quality degradation caused by the columnar spacer 21 can be suppressed. It is not necessary to light-block the portion that should be the pixel opening in order to prevent the display quality from degrading, which is advantageous in terms of the aperture ratio.

A height of the protruding portion 19 is not particularly limited, but is preferably 1.2 μm or more from the perspective of more reliably preventing the portion of the first alignment film AF1 positioned in the pixel opening from being rubbed or scratched.

Note that FIG. 19A illustrates a configuration in which a shape of the protruding portion 19 (the shape when viewed from the normal direction of the substrate plane) is substantially octagonal, but the shape of the protruding portion 19 is not limited to the illustrated example.

In a case that the horizontal stripe arrangement is employed as in the liquid crystal display device 200 in the second embodiment, a similar effect can be obtained by providing a protruding portion overlapping the columnar spacer on the active matrix substrate 1 side.

As described above, according to the embodiments of the disclosure, it is possible to reduce the manufacturing processes of the liquid crystal display device in the FFS mode including the oxide semiconductor TFT having the top gate structure as the pixel TFT to reduce the manufacturing costs.

Note that FIG. 1 and FIG. 15 illustrate the example in which the color display pixels CP are constituted by three pixels exhibiting the colors different from each other, but the color display pixels CP may be constituted by four or more pixels exhibiting colors different from each other. For example, a plurality of pixels constituting one color display pixel CP may include a yellow pixel displaying yellow in addition to red pixel R, the green pixel G, and the blue pixel B.

Oxide Semiconductor

An oxide semiconductor included in the oxide semiconductor layer 12 may be an amorphous oxide semiconductor, or may be a crystalline oxide semiconductor including a crystalline portion. Examples of the crystalline oxide semiconductor include a polycrystalline oxide semiconductor, a microcrystalline oxide semiconductor, or a crystalline oxide semiconductor having a c-axis oriented substantially perpendicular to the layer surface.

The oxide semiconductor layer 12 may have a layered structure including two or more layers. In a case that the oxide semiconductor layer 12 includes a layered structure, the oxide semiconductor layer 12 may include an amorphous oxide semiconductor layer and a crystalline oxide semiconductor layer. Alternatively, the oxide semiconductor layer 12 may include a plurality of crystalline oxide semiconductor layers having different crystal structures. The oxide semiconductor layer 12 may include a plurality of amorphous oxide semiconductor layers. In a case that the oxide semiconductor layer 12 has a dual-layer structure including an upper layer and a lower layer, an energy gap of the oxide semiconductor included in the lower layer is preferably greater than an energy gap of the oxide semiconductor included in the upper layer. However, when the difference in energy gap between these layers is relatively small, the energy gap of the oxide semiconductor in the upper layer may be greater than the energy gap of the oxide semiconductor in the lower layer.

Materials, structures, and film formation methods of an amorphous oxide semiconductor and the above-described crystalline oxide semiconductors, a configuration of an oxide semiconductor layer including a layered structure, and the like are described in, for example, JP 2014-007399 A. The entire contents of the disclosure of JP 2014-007399 A are incorporated herein by reference.

The oxide semiconductor layer 12 may include, for example, at least one metal element selected from In, Ga, and Zn. In the present embodiment, the oxide semiconductor layer 12 includes, for example, an In—Ga—Zn—O based semiconductor (for example, an indium gallium zinc oxide). Here, the In—Ga—Zn—O based semiconductor is a ternary oxide of In (indium), Ga (gallium), and Zn (zinc), and a ratio (composition ratio) of In, Ga, and Zn is not particularly limited. For example, the ratio includes In:Ga:Zn=2:2:1, In:Ga:Zn=1:1:1, or In:Ga:Zn=1:1:2, or the like. Such an oxide semiconductor layer 12 can be formed of an oxide semiconductor film including the In—Ga—Zn—O based semiconductor.

The In—Ga—Zn—O based semiconductor may be an amorphous semiconductor or may be a crystalline semiconductor. A crystalline In—Ga—Zn—O based semiconductor in which a c-axis is oriented substantially perpendicular to a layer surface is preferable as the crystalline In—Ga—Zn—O based semiconductor.

Note that a crystal structure of the crystalline In—Ga—Zn—O based semiconductor is disclosed in, for example, JP 2014-007399 A, JP 2012-134475 A, and JP 2014-209727 A as described above. The entire contents of the disclosure of JP 2012-134475 A and JP 2014-209727 A are incorporated herein by reference. A TFT including an In—Ga—Zn—O based semiconductor layer has high mobility (more than 20 times as compared to an a-Si TFT) and a low leakage current (less than 1/100-th as compared to the a-Si TFT). Thus, such a TFT can be suitably used as a driving TFT (for example, a TFT included in a drive circuit provided in a periphery of a display region including a plurality of pixels, and on the same substrate as the display region) and a pixel TFT (TFT provided in a pixel).

In place of the In—Ga—Zn—O based semiconductor, the oxide semiconductor layer 12 may include another oxide semiconductor. For example, the oxide semiconductor layer may include an In—Sn—Zn—O based semiconductor (for example, $In_2O_3$—$SnO_2$—$ZnO$; InSnZnO). The In—Sn—Zn—O based semiconductor is a ternary oxide of In (indium), Sn (tin), and Zn (zinc). Alternatively, the oxide semiconductor layer 12 may include an In—Al—Zn—O based semiconductor, an In—Al—Sn—Zn—O based semiconductor, a Zn—C based semiconductor, an In—Zn—O based semiconductor, a Zn—Ti—C based semiconductor, a Cd—Ge—O based semiconductor, a Cd—Pb—C based semiconductor, CdO (cadmium oxide), a Mg—Zn—O based semiconductor, an In—Ga—Sn—O based semiconductor, an In—Ga—O based semiconductor, a Zr—In—Zn—O based semiconductor, a Hf—In—Zn—O based semiconductor, an Al—Ga—Zn—O based semiconductor, a Ga—Zn—O based semiconductor, an In—Ga—Zn—Sn—O based semiconductor, and the like.

INDUSTRIAL APPLICABILITY

According to the embodiments of the disclosure, it is possible to reduce the manufacturing processes of the liquid crystal display device in an FFS mode including the oxide semiconductor TFT having the top gate structure as the pixel TFT to reduce the manufacturing costs.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

The invention claimed is:

1. A liquid crystal display device comprising:
an active matrix substrate;
a counter substrate disposed to face the active matrix substrate;
a liquid crystal layer provided between the active matrix substrate and the counter substrate; and
a plurality of pixels arranged in a matrix including a plurality of rows and a plurality of columns,
wherein the active matrix substrate includes
a first substrate having a main surface,
a plurality of light blocking layers provided on the main surface of the first substrate,
a lower insulating layer provided to cover the plurality of light blocking layers,
pixel TFTs, each pixel TFT being provided corresponding to each of the plurality of pixels, the pixel TFT including an oxide semiconductor layer provided on the lower insulating layer, a gate insulating layer provided on the oxide semiconductor layer, and a gate electrode provided to face the oxide semiconductor layer with the gate insulating layer interposed between the gate electrode and the oxide semiconductor layer,
a plurality of gate wiring lines extending in a row direction, each gate wiring line being formed from a conductive film the same as the gate electrode,
a plurality of source wiring lines extending in a column direction,
a plurality of pixel electrodes, each pixel electrode being provided in each of the plurality of pixels and electrically connected to the pixel TFT,
an interlayer insulating layer provided to cover the oxide semiconductor layer, the gate electrode, and the plurality of gate wiring lines, and
a common electrode provided on the interlayer insulating layer,
the oxide semiconductor layer includes a channel region, a first low-resistive region, and a second low-resistive region, the first low-resistive region and the second low-resistive region being located on both sides of the channel region and having specific resistances lower than the channel region,
the plurality of source wiring lines are located between the main surface of the first substrate and the lower insulating layer, and are formed from a conductive film the same as the plurality of light blocking layers,
the pixel electrode is formed from an oxide film the same as the oxide semiconductor film, and is continuous with the second low-resistive region of the oxide semiconductor layer, and the active matrix substrate further includes a connection electrode formed from a transparent conductive film the same as the common electrode, the connection electrode connecting any one of the plurality of source wiring lines to the first low-resistive region of the oxide semiconductor layer.

2. The liquid crystal display device according to claim 1, wherein the connection electrode connects any one of the plurality of source wiring lines to the first low-resistive region of the oxide semiconductor layer within a contact hole formed in the interlayer insulating layer and the lower insulating layer.

3. The liquid crystal display device according to claim 2, wherein the oxide semiconductor layer overlaps a substantial half of a region located within the contact hole of the corresponding source wiring line when viewed from a normal direction of the main surface of the first substrate.

4. The liquid crystal display device according to claim 1, wherein the plurality of pixels constitute a plurality of color display pixels, and
each of the plurality of color display pixels includes three or more pixels arranged in the column direction and exhibiting colors different from each other.

5. The liquid crystal display device according to claim 4, wherein the active matrix substrate further includes a gate wiring line drive circuit configured to drive the plurality of gate wiring lines, and
the gate wiring line drive circuit being monolithically formed on the first substrate.

6. The liquid crystal display device according to claim 1, wherein the active matrix substrate does not include an organic insulating layer between the common electrode and the first substrate.

7. The liquid crystal display device according to claim 1, wherein the counter substrate includes
a second substrate, and
a plurality of columnar spacers provided on the second substrate, and
the active matrix substrate further includes
a plurality of protruding portions formed from an organic insulating material and positioned in a layer above the common electrode, each of the plurality of protruding parts overlapping each of the plurality of columnar spacers when viewed from the normal direction of the main surface of the first substrate.

8. The liquid crystal display device according to claim 1, wherein the oxide semiconductor layer includes an In—Ga—Zn—O based semiconductor.

9. The liquid crystal display device according to claim 8, wherein the In—Ga—Zn—O based semiconductor includes a crystalline portion.

10. A manufacturing method of a liquid crystal display device, the liquid crystal display device being according to claim 1, the method comprising:
(A) preparing the active matrix substrate; and
(B) preparing the counter substrate,
wherein the (A) preparing the active matrix substrate includes
(a) depositing a first conductive film on the main surface of the first substrate, and then, patterning the first conductive film to form the plurality of light blocking layers and the plurality of source wiring lines,
(b) forming the lower insulating layer to cover the plurality of light blocking layers and the plurality of source wiring lines, and then, depositing an oxide semiconductor film on the lower insulating layer, and then, patterning the oxide semiconductor film,
(c) depositing an insulating film and a second conductive film in this order to cover the oxide semiconductor film, and then, patterning the insulating film and the second conductive film to form the gate insulating layer, the gate electrode, and the plurality of gate wiring lines,
(d) forming the interlayer insulating layer to cover the oxide semiconductor layer, the gate electrode, and the plurality of gate wiring lines, and
(e) depositing a transparent conductive film on the interlayer insulating layer, and then, patterning the transparent conductive film to form the common electrode, and the (A) preparing the active matrix substrate further includes
(f) lowering a resistance of a portion of the oxide semiconductor film to obtain the first low-resistive region, the second low-resistive region, and the pixel electrode,
wherein the (e) depositing a transparent conductive film includes patterning the transparent conductive film to form a connection electrode with the common electrode, the connection electrode connecting any one of the plurality of source wiring lines to the first low-resistive region.

* * * * *